(12) United States Patent
Lee et al.

(10) Patent No.: US 10,548,003 B2
(45) Date of Patent: Jan. 28, 2020

(54) ELECTRONIC DEVICE FOR CONTROLLING AN EXTERNAL DEVICE USING A NUMBER AND METHOD THEREOF

(71) Applicant: SAMSUNG ELECTRONICS CO., LTD., Suwon-si (KR)

(72) Inventors: Ho-Jun Lee, Osan-si (KR); Deok-Ho Kim, Seoul (KR); Min-Seok Kim, Suwon-si (KR); Yeul-Tak Sung, Seoul (KR); Jung-Kih Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 426 days.

(21) Appl. No.: 14/598,900

(22) Filed: Jan. 16, 2015

(65) Prior Publication Data
US 2015/0207794 A1    Jul. 23, 2015

Related U.S. Application Data

(60) Provisional application No. 61/936,713, filed on Feb. 6, 2014, provisional application No. 61/929,234, filed on Jan. 20, 2014.

(30) Foreign Application Priority Data

Feb. 21, 2014    (KR) .......................... 10-2014-0020909
Nov. 27, 2014    (KR) .......................... 10-2014-0167577

(51) Int. Cl.
*H04W 12/00*    (2009.01)
(52) U.S. Cl.
CPC ................ *H04W 12/0027* (2019.01)
(58) Field of Classification Search
CPC ... H04L 63/0876; H04L 63/083; H04L 63/10; H04L 63/0281; H04L 12/2812;
(Continued)

(56) References Cited

U.S. PATENT DOCUMENTS 7,440,445 B1* 10/2008 Croak ................. H04M 3/4931
                                                                370/352
7,774,388 B1*  8/2010 Runchey ................. G06F 16/95
                                                                707/811
(Continued)

FOREIGN PATENT DOCUMENTS

CN        101520816 A      9/2009
CN        102244676 A     11/2011
(Continued)

OTHER PUBLICATIONS

Search Report dated Mar. 26, 2015 by the International Searching Authority in related Application No. PCT/KR2015/000381.
(Continued)

*Primary Examiner* — Blake J Rubin
(74) *Attorney, Agent, or Firm* — Sughrue Mion, PLLC

(57) ABSTRACT

An electronic device and method for controlling an external device using a number are provided. The electronic device includes a processor configured to transmit an input number to a server over a mobile network, in response to a connection being input, receive an identifier of the external device, which is issued by the server, send a connection request to the external device over the mobile network using the received identifier of the external device, and control the external device by sending a control command to the external device, in response to receiving an indication regarding completion of access authentication from the external device, and a communication interface configured to perform communication with the external device and the server.

18 Claims, 21 Drawing Sheets

(58) Field of Classification Search
CPC ............. H04L 12/2834; H04L 61/1541; H04L 61/1552; H04L 61/605; H04L 2012/2841; H04L 2012/2849; H04W 4/16; H04W 4/20
See application file for complete search history.

(56) References Cited

U.S. PATENT DOCUMENTS

| | | | | |
|---|---|---|---|---|
| 8,467,770 | B1* | 6/2013 | Ben Ayed | H04L 63/107 455/411 |
| 8,634,809 | B1* | 1/2014 | Pfeffer | H04N 21/4788 455/412.2 |
| 2005/0160477 | A1 | 6/2005 | Saito | |
| 2008/0201751 | A1* | 8/2008 | Ahmed | H04N 21/4312 725/109 |
| 2008/0225120 | A1* | 9/2008 | Stuecker | G08B 13/19626 348/155 |
| 2008/0254840 | A1* | 10/2008 | Kano | H04N 7/147 455/566 |
| 2008/0299905 | A1* | 12/2008 | Kumar | H04M 1/7253 455/41.2 |
| 2009/0086688 | A1 | 4/2009 | Kvache et al. | |
| 2009/0328118 | A1* | 12/2009 | Ravishankar | H04M 3/42042 725/106 |
| 2010/0192206 | A1* | 7/2010 | Aoyama | H04L 12/1818 726/5 |
| 2010/0229197 | A1* | 9/2010 | Yi | H04N 21/235 725/40 |
| 2010/0317332 | A1* | 12/2010 | Bathiche | H04B 1/202 455/418 |
| 2011/0072114 | A1* | 3/2011 | Hoffert | G06F 17/30905 709/219 |
| 2011/0106279 | A1 | 5/2011 | Cho et al. | |
| 2011/0106736 | A1* | 5/2011 | Aharonson | G06Q 10/109 706/12 |
| 2011/0119346 | A1 | 5/2011 | Kim et al. | |
| 2011/0283334 | A1 | 11/2011 | Choi et al. | |
| 2012/0094696 | A1* | 4/2012 | Ahn | H04W 4/028 455/456.2 |
| 2012/0131640 | A1 | 5/2012 | Rahman et al. | |
| 2012/0151058 | A1 | 6/2012 | Lee | |
| 2012/0151525 | A1* | 6/2012 | Demchenko | H04N 21/482 725/39 |
| 2012/0278738 | A1* | 11/2012 | Kruse | G06Q 10/10 715/754 |
| 2012/0297470 | A1* | 11/2012 | Kwon | H04L 9/083 726/7 |
| 2013/0019262 | A1* | 1/2013 | Bhatia | H04N 21/252 725/34 |
| 2013/0103527 | A1* | 4/2013 | Cho | G06Q 30/0601 705/26.1 |
| 2013/0106979 | A1* | 5/2013 | Chang | H04N 7/147 348/14.02 |
| 2013/0219072 | A1* | 8/2013 | Han | H04L 65/60 709/228 |
| 2013/0304587 | A1 | 11/2013 | Ralston | |
| 2014/0003599 | A1 | 1/2014 | Kim et al. | |
| 2014/0007211 | A1* | 1/2014 | Yang | H04L 63/08 726/7 |
| 2014/0033255 | A1* | 1/2014 | Daly | H04N 21/6175 725/37 |
| 2014/0053191 | A1* | 2/2014 | Selim | G06F 3/017 725/37 |
| 2014/0068520 | A1* | 3/2014 | Missig | G06F 3/0482 715/841 |
| 2014/0089416 | A1* | 3/2014 | Wang | H04L 51/04 709/205 |
| 2014/0149592 | A1* | 5/2014 | Krishna | G06F 1/329 709/226 |
| 2014/0154987 | A1* | 6/2014 | Lee | H04W 76/14 455/41.2 |
| 2014/0181886 | A1* | 6/2014 | Goodman | H04M 3/42042 725/133 |
| 2014/0215614 | A1* | 7/2014 | Beskrovny | G06F 21/51 726/23 |
| 2014/0269497 | A1* | 9/2014 | Jain | H04L 65/1069 370/328 |
| 2014/0269614 | A1* | 9/2014 | Maguire | H04W 4/80 370/331 |
| 2014/0337880 | A1* | 11/2014 | Sorbel | H04N 21/812 725/34 |
| 2014/0344446 | A1* | 11/2014 | Rjeili | H04L 43/04 709/224 |
| 2015/0009916 | A1* | 1/2015 | Wendling | H04L 61/2007 370/329 |
| 2015/0022619 | A1* | 1/2015 | Aleixo Dinis Lopes | H04L 65/1073 348/14.02 |
| 2015/0045073 | A1* | 2/2015 | Koo | H04W 4/12 455/466 |
| 2015/0049160 | A1* | 2/2015 | Krishnamoorthy | H04N 7/141 348/14.03 |
| 2015/0097669 | A1* | 4/2015 | Li | G08B 5/222 340/539.13 |
| 2015/0304318 | A1* | 10/2015 | Delsuc | H04L 63/0815 726/7 |
| 2015/0312296 | A1* | 10/2015 | Song | H04L 65/4061 709/203 |
| 2015/0326718 | A1* | 11/2015 | Wang | H04M 3/42263 370/259 |
| 2016/0054971 | A1* | 2/2016 | Yu | H04N 7/15 345/2.1 |
| 2016/0150089 | A1* | 5/2016 | Garg | H04M 7/003 370/352 |
| 2016/0165056 | A1* | 6/2016 | Bargetzi | G06Q 10/1095 455/416 |
| 2016/0198319 | A1* | 7/2016 | Huang | H04L 67/26 455/412.2 |
| 2016/0261818 | A1* | 9/2016 | Du | H04N 21/42204 |
| 2017/0149873 | A1* | 5/2017 | Jang | H04N 21/4402 |

FOREIGN PATENT DOCUMENTS

| | | |
|---|---|---|
| CN | 102668592 A | 9/2012 |
| KR | 10-2009-0024032 A | 3/2009 |

OTHER PUBLICATIONS

Written Opinion dated Mar. 26, 2015 by the International Searching Authority in related Application No. PCT/KR2015/000381.
Communication dated Jul. 25, 2017 by the European Patent Office in counterpart European Patent Application No. 15737322.6.
Communication dated Jan. 25, 2019 issued by the State Intellectual Property Office of P.R. China in counterpart Chinese Application No. 201580009770.5.
Communication dated Mar. 6, 2019, issued by the European Patent Office in counterpart European Application No. 18214697.7.

* cited by examiner

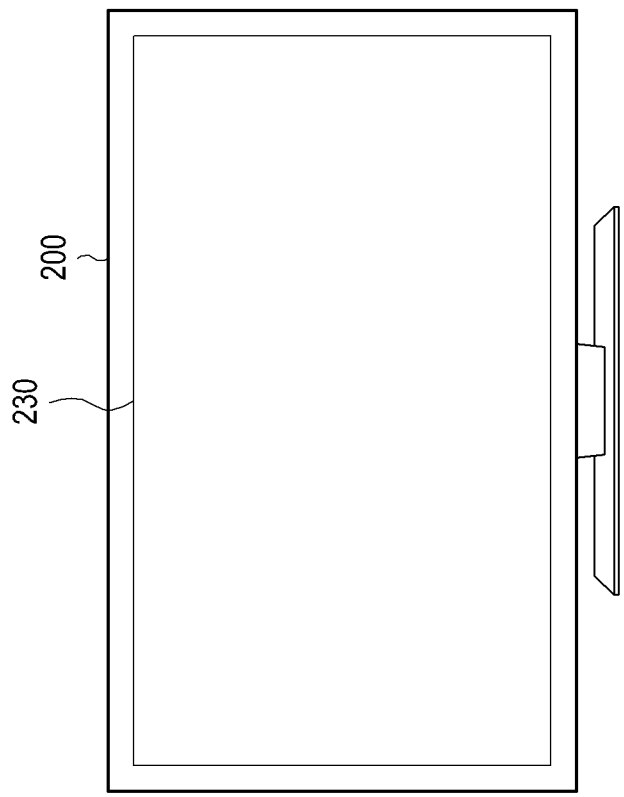
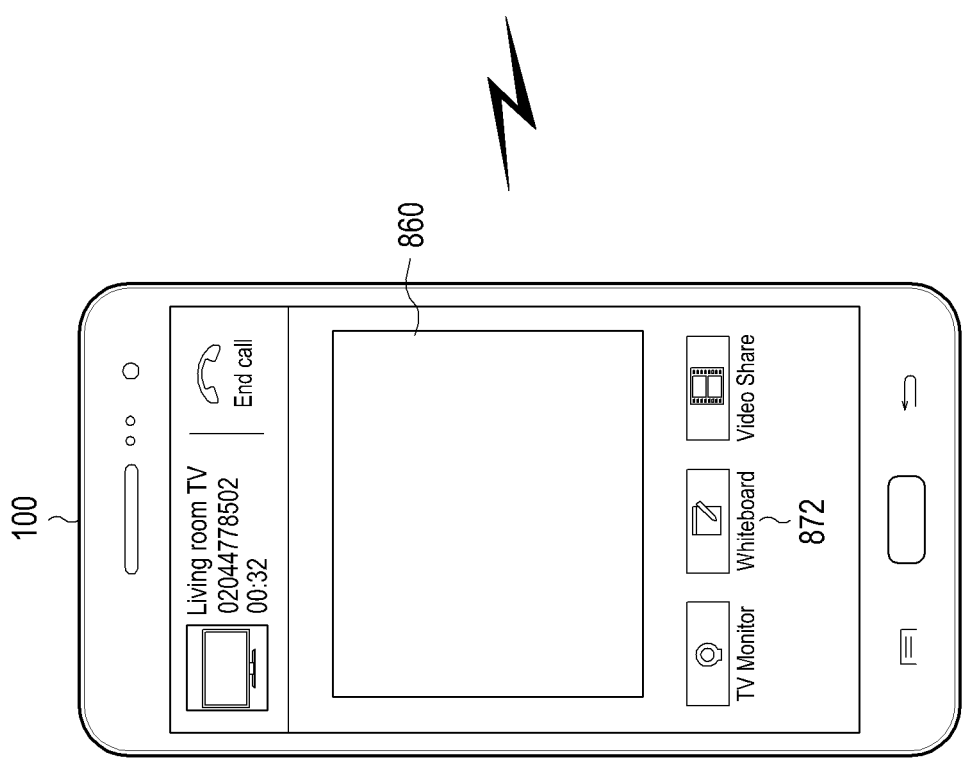

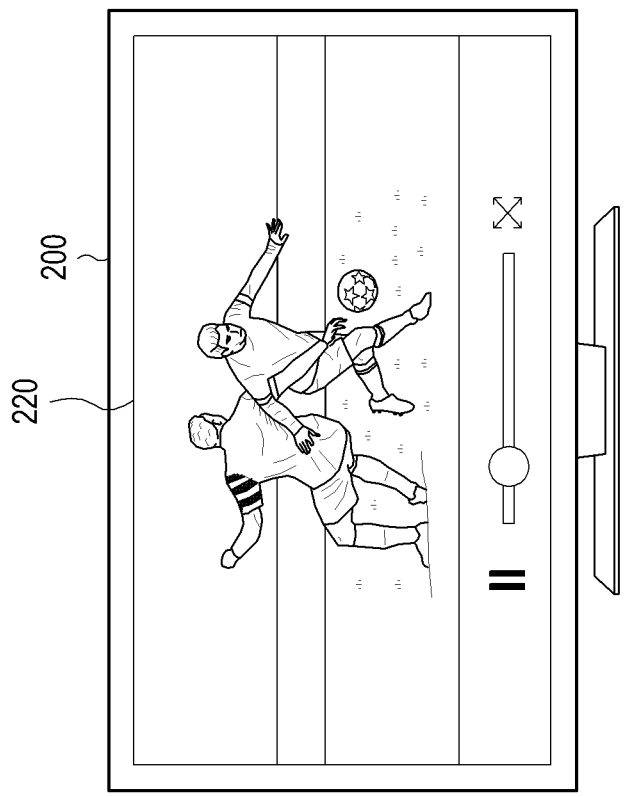
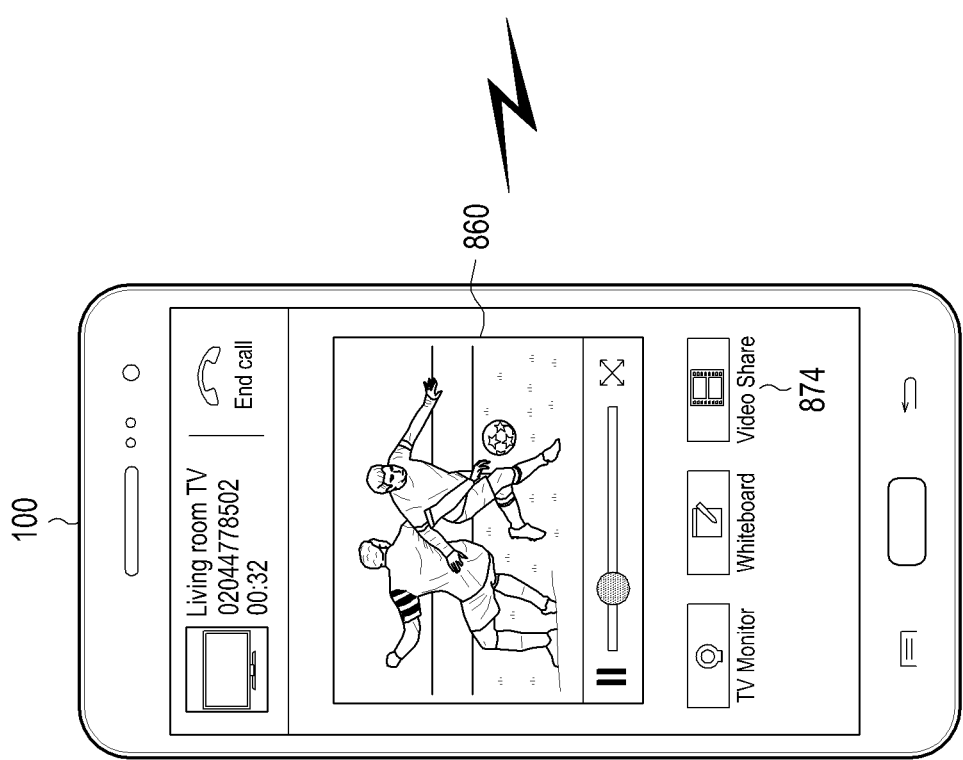
FIG.12B
FIG.12A

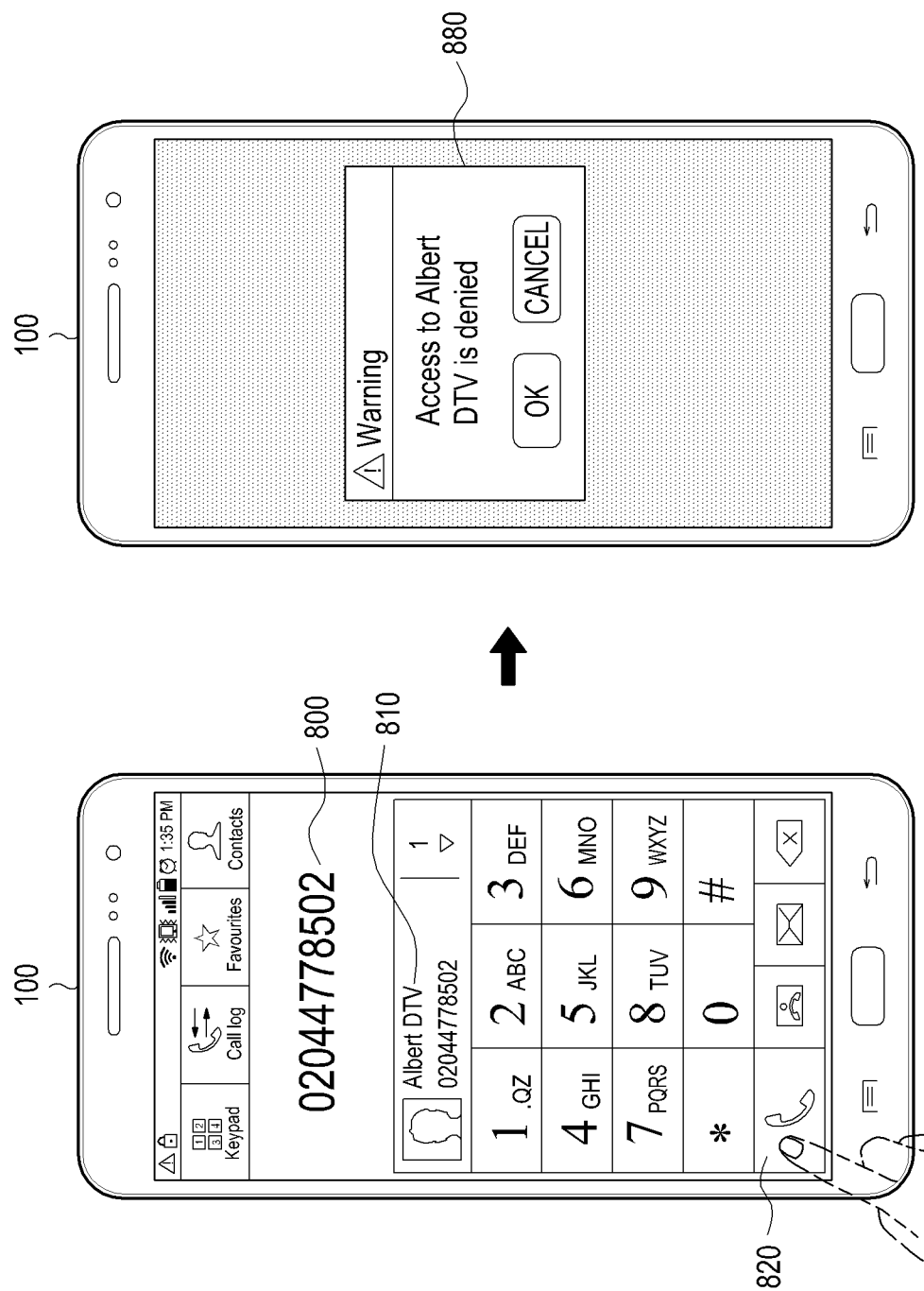

ELECTRONIC DEVICE FOR CONTROLLING AN EXTERNAL DEVICE USING A NUMBER AND METHOD THEREOF

CROSS REFERENCE TO RELATED APPLICATIONS

This application claims priority from U.S. Provisional Application No. 61/929,234, filed in the United States Patent and Trademark Office on Jan. 20, 2014, U.S. Provisional Application No. 61/936,713, filed in the United States Patent and Trademark Office on Feb. 6, 2014, Korean Patent Application No. 10-2014-0020909, filed in the Korean Intellectual Property Office on Feb. 21, 2014, and Korean Patent Application No. 10-2014-0167577, filed in the Korean Intellectual Property Office on Nov. 27, 2014, the entire disclosures of which are incorporated herein by reference.

BACKGROUND

1. Field

Methods and devices consistent with the exemplary embodiments relate to an electronic device and a method for controlling the same, and more particularly, to an electronic device for effectively controlling an external device using a number and a method thereof.

2. Description of the Related Art

Recently, technology using electronic devices has been rapidly developed. In particular, an electronic device can communicate with an external device over the Internet by being connected to a network.

In particular, the electronic device may be connected to the external device over the network to provide a variety of services. For example, the electronic device and the external device may perform a function of exchanging or sharing data with each other.

In recent years, the technology for the electronic device to control the external device over the network has been developed. However, in order to control the external device, the electronic device should use special equipment or perform a connection using a method which may be difficult to access.

The above information is presented as background information only in order to assist with understanding the exemplary embodiments. No determination has been made, and no assertion is made, as to whether any of the above might be applicable as prior art with regard to the present disclosure.

SUMMARY

One or more exemplary embodiments provide an electronic device that can send a connection request to an external device, using a phone number of the registered external device, which is issued in a server.

One or more exemplary embodiments also provide an electronic device that can receive an identifier of an external device based on a phone number of the external device, and control the external device using the identifier of the external device.

In accordance with an aspect of an exemplary embodiment, there is provided an electronic device for controlling an external device using a number. The electronic device includes a processor configured to: transmit an input number to a server over a mobile network, in response to a connection being input; receive an identifier of the external device, which is issued by the server; send a connection request to the external device over the mobile network using the received identifier of the external device; and control the external device by sending a control command to the external device, in response to receiving an indication regarding completion of access authentication from the external device; and a communication interface configured to perform communication with the external device and the server.

In accordance with an aspect of another exemplary embodiment, there is provided a server that includes a communication unit communicator configured to perform communication with an electronic device and an external device; a controller is configured to register an external device in the server, wherein the external device is a control target, and the controller is configured to receive an identification number that is input to the electronic device, from the electronic device; generate and issue an identification number of the registered external device; determine whether the identification number received from the electronic device is the same as the identification number of the registered external device in order to perform service authentication; and control the communication interface to transmit an identifier of the external device to the electronic device; and a database configured to store the issued identification number of the external device.

In accordance with an aspect of another exemplary embodiment, there is provided a method for controlling an external device using a number. The method includes transmitting, from an electronic device, an input number to a server over a mobile network, in response to a connection being input; receiving, at the electronic device, an identifier of the external device, which is issued in the server, from the server, in response to service authentication being performed when the input number is the same as a number of the external device registered in the server; sending, from the electronic device, a connection request to the external device over the mobile network using the received identifier of the external device; and controlling the external device by sending a control command from the electronic device to the external device, in response to receiving an indication regarding completion of access authentication from the external device.

Other aspects and features of the exemplary embodiments will become apparent to those skilled in the art from the following detailed description taken in conjunction with the annexed drawings.

BRIEF DESCRIPTION OF THE DRAWINGS

The above and other aspects will be more apparent from the following description of exemplary embodiments taken in conjunction with the accompanying drawings, in which:

FIGS. 8A to 13B illustrate screens on which a method of controlling an external device using a phone number is executed, according to an exemplary embodiment;

FIGS. 16A and 16B illustrate a case where an electronic device fails to access an external device based on access information, according to an exemplary embodiment;

DETAILED DESCRIPTION

Figure 1:
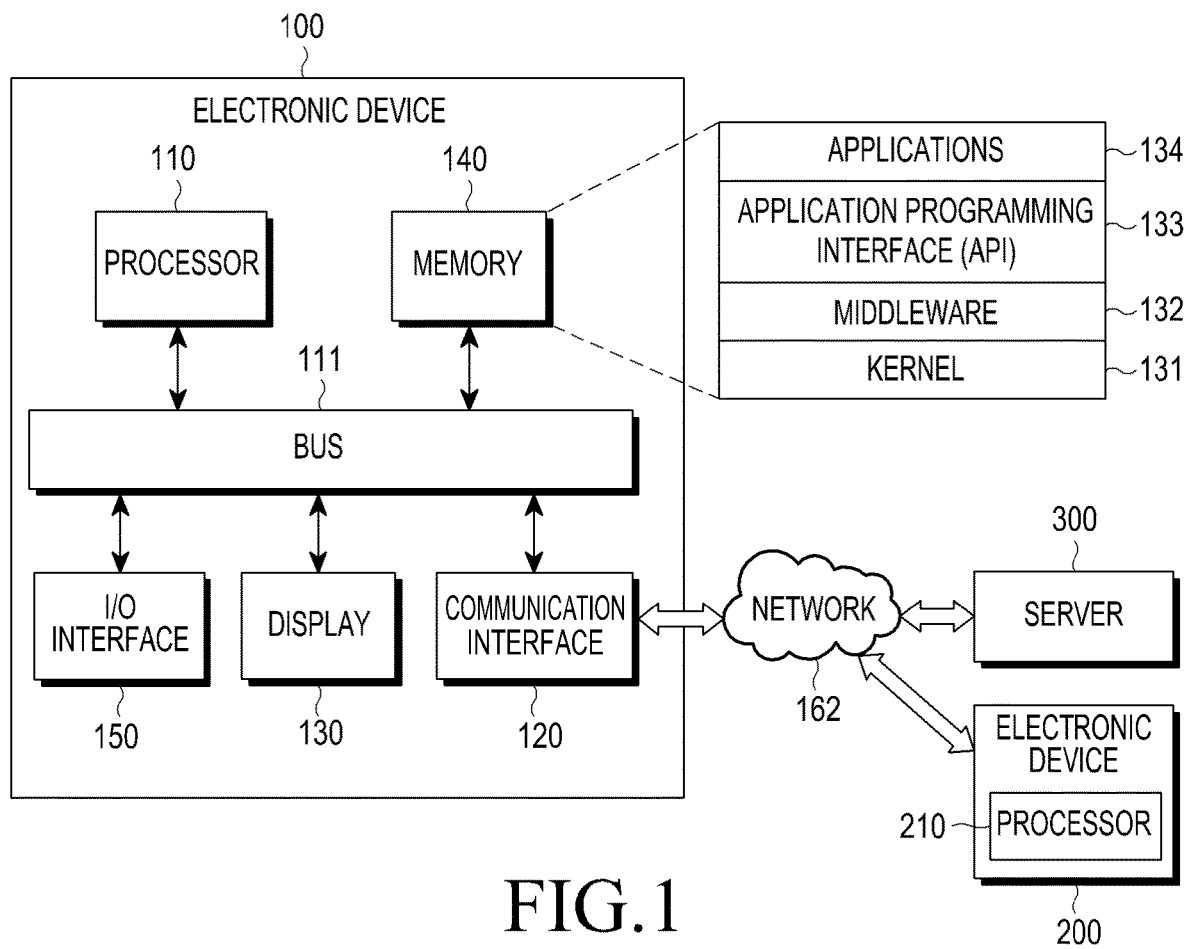
FIG. 1 illustrates a network environment including an electronic device according to various exemplary embodiments.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the exemplary embodiments described herein can be made without departing from the scope and spirit of the inventive concept. In addition, descriptions of well-known functions and constructions may be omitted for clarity and conciseness. Throughout the drawings, like reference numerals will be understood to refer to like parts, components, and structures.

The terms and words used in the following description and claims are not limited to the bibliographical meanings, but, are merely used to enable a clear and consistent understanding of the disclosure. Accordingly, it should be apparent to those skilled in the art that the following description of exemplary embodiments is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various exemplary embodiments may be a device equipped with a communication function. For example, the electronic device may be at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, and a wearable device (e.g., a Head Mounted Device (HMD) (such as electronic eyeglasses), electronic apparel, electronic bracelet, electronic necklace, electronic accessory, electronic tattoo, or smart watch).

In certain exemplary embodiments, the electronic device may be a smart home appliance equipped with a communication function. The smart home appliance may include at least one of, for example, a Television (TV), a Digital Video Disk (DVD) player, an audio player, a refrigerator, an air conditioner, a vacuum cleaner, an oven, a microwave oven, a washer, an air purifier, a set-top box, a TV box (e.g., a Samsung HomeSync™, an Apple TV™, or a Google TV™), a game console, an electronic dictionary, an electronic key, a camcorder and an electronic photo frame.

In certain exemplary embodiments, the electronic device may be at least one of various medical devices (e.g., Magnetic Resonance Angiography (MRA), Magnetic Resonance Imaging (MRI), Computed Tomography (CT), a medical camcorder, a medical ultrasonic device, or the like), a navigation device, a Global Positioning System (GPS) receiver, an Event Data Recorder (EDR), a Flight Data Recorder (FDR), an automotive infotainment device, a marine electronic device (e.g., a marine navigation device, a gyro compass, or the like), an avionics, a security device, a car head unit, an industrial or household robot, an Automatic Teller's Machine (ATM) for banks, and a Point Of Sales (POS) for shops.

In certain exemplary embodiments, the electronic device may be at least one of a part of the furniture or building/structure equipped with a communication function, an electronic board, an electronic signature receiving device, a projector, and various metering devices (e.g., a water meter, an electricity meter, a gas meter, a radio wave meter, or the like). The electronic device according to various exemplary embodiments may be one of the above-described various devices, or a combination thereof. In addition, the electronic device according to various exemplary embodiments can be flexible and is not limited to a particular device. It will be apparent to those of ordinary skill in the art that the electronic device according to various exemplary embodiments is not limited to the above-described devices.

The electronic device according to various exemplary embodiments will be described below with reference to the accompanying drawings. The term 'user' as used herein may refer to a person using the electronic device, or a device (e.g., an intelligent electronic device) using the electronic device.

FIG. 1 illustrates a network environment 10 including an electronic device 100 according to various exemplary embodiments. Referring to FIG. 1, the electronic device 100 may include a bus 111, a processor 110, a memory 140, an Input/Output (I/O) interface 150, a display 130, and a communication interface 120.

The bus 111 may be a circuit that connects the above-described components to each other, and sends communication signals (e.g., control messages) between the components.

The processor 110 may, for example, receive a command from the other components (e.g., the memory 140, the I/O interface 150, the display 130, the communication interface 120, or the like) through the bus 111, decrypt the received command, and execute an operation or data processing based on the decrypted command.

The memory 140 may store the command or data, which is received from the processor 110 or the other components (e.g., the I/O interface 150, the display 130, the communication interface 120, or the like), or generated by the processor 110 or the other components. The memory 140 may include programming modules such as, for example, a kernel 131, a middleware 132, an Application Programming Interface (API) 133, or an application(s) 134. Each of the programming modules may be configured by one of software, firmware and hardware, or a combination thereof.

The kernel 131 may control or manage the system resources (e.g., the bus 111, the processor 110, the memory 140, or the like) used to execute the operation or function implemented in the other programming modules (e.g., the middleware 132, the API 133 or the application 134). The kernel 131 may provide an interface through which the middleware 132, the API 133 or the application 134 can access the individual components of the electronic device 100, and control or manage the components.

The middleware 132 may play an intermediary role so that the API 133 or the application 134 may communicate with the kernel 131 to exchange data with each other. With respect to the work requests received from the application 134, the middleware 132 may, for example, perform control (e.g., scheduling or load balancing) for the work request, using a method such as assigning the priority for using the system resources (e.g., the bus 111, the processor 110, the memory 140, or the like) of the electronic device 100, to at least one of the application(s) 134.

The API 133 may include at least one interface or function (e.g., command) for, for example, file control, window control, image processing or character control, as an interface through which the application 134 controls the function provided from the kernel 131 or the middleware 132.

In various exemplary embodiments, the application 134 may include a Short Message Service (SMS)/Multimedia Messaging Service (MMS) application, an e-mail application, a calendar application, an alarm application, a healthcare application (e.g., an application for measuring an amount of exercise activity or a blood glucose level), or an environmental information application (e.g., an application for providing the pressure, humidity or temperature information of an environment). Additionally or alternatively, the application 134 may be an application related to information exchange between the electronic device 100 and an external device (e.g., an external electronic device 200). The information exchange-related application may include, for example, a notification relay application for relaying specific information to the external device, or a device management application for managing the external device.

For example, the notification relay application may include a function of relaying the notification information generated in other applications (e.g., the SMS/MMS application, the e-mail application, the healthcare application, the environmental information application, or the like) of the electronic device 100, to the external device (e.g., the external electronic device 200). Additionally or alternatively, the notification relay application may, for example, receive notification information from the external device (e.g., the external electronic device 200) and provide the received notification information to the user. The device management application may, for example, manage a function (e.g., a function of turning on/off the external device itself (or some components thereof) or adjusting the brightness or resolution of a display thereof) of at least a part of the external device (e.g., the external electronic device 200) communicating with the electronic device 100, or may manage (e.g., install, delete or update) the application operating in the external device or the service (e.g., a call service or a message service) provided in the external device.

In various exemplary embodiments, the application 134 may include an application that is specified according to the properties (e.g., the type of an electronic device) of the external device (e.g., the external electronic device 200). For example, if the external device is an MP3 player, the application 134 may include an application related to music playback. Similarly, if the external device is a mobile medical device, the application 134 may include an application related to healthcare. In one exemplary embodiment, the application 134 may include at least one of an application specified in the electronic device 100, and an application received from the external device (e.g., a server 300 or the external electronic device 200).

The I/O interface 150 may, for example, send the command or data that is received from the user through an I/O device (e.g., a sensor, a keyboard or a touch screen), to the processor 110, the memory 140 or the communication interface 120 through the bus 111. For example, the I/O interface 150 may provide the data for a user's touch input on the touch screen, to the processor 110. The I/O interface 150 may, for example, output the command or data that is received from the processor 110, the memory 140 or the communication interface 120 through the bus 111, externally through the I/O device (e.g., a speaker or a display). For example, the I/O interface 150 may output the voice data that is processed by the processor 110, to the user through the speaker.

The display 130 may display a variety of information (e.g., multimedia data, text data, or the like) for the user.

The communication interface 120 may establish communication between the electronic device 100 and the external device (e.g., the external electronic device 200 or the server 300). For example, the communication interface 120 may be connected to a network 162 by wireless communication or wired communication, to communicate with the external electronic device 200. The wireless communication may include at least one of, for example, Wireless Fidelity (WiFi), Bluetooth (BT), Near Field Communication (NFC), GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), or the like). The wired communication may include at least one of, for example, Universal Serial Bus (USB), High Definition Multimedia Interface (HDMI), Recommended Standard 232 (RS-232), and Plain Old Telephone Service (POTS).

In one exemplary embodiment, the network 162 may be a telecommunications network. The telecommunications network may include at least one of a computer network, the Internet, Internet of Things (IoT), and a telephone network. In one exemplary embodiment, a protocol (e.g., a transport layer protocol, a data link layer protocol or a physical layer protocol) for communication between the electronic device 100 and the external device may be supported by at least one of the application 134, the API 133, the middleware 132, the kernel 131 or the communication interface 120.

Figure 2:
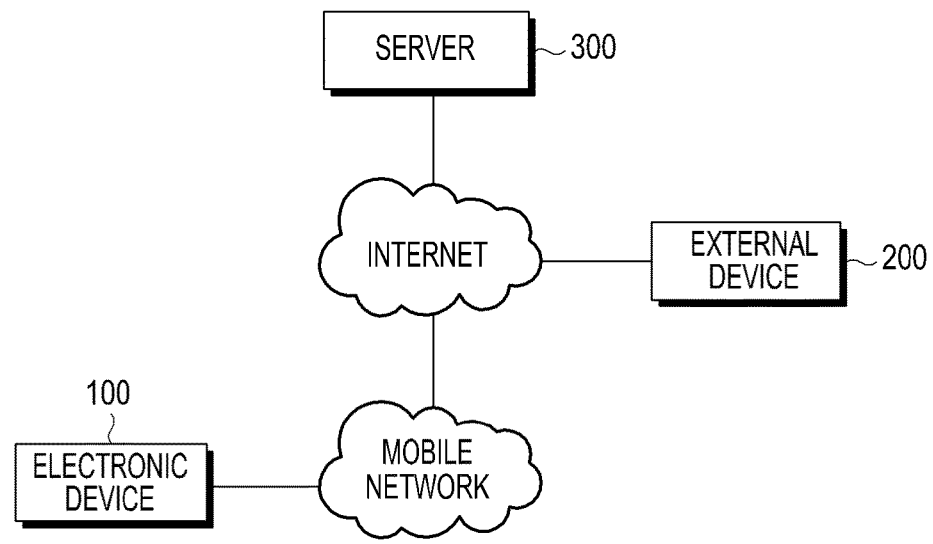
FIG. 2 illustrates an electronic device, an external device and a server, which are implemented in a method of controlling an external device using a phone number, according to an exemplary embodiment.

FIG. 2 illustrates an electronic device, an external device and a server, which are implemented in a method of controlling an external device using a phone number according to an exemplary embodiment.

Referring to FIG. 2, the electronic device 100, the external device 200 and the server 300 may be connected to the mobile network. Therefore, the electronic device 100, the external device 200 and the server 300 may be connected to the Internet over the mobile network. The electronic device 100 and the external device 200 may be assigned their own Internet Protocol (IP) addresses, to perform an Internet connection over the mobile network.

Figure 3:
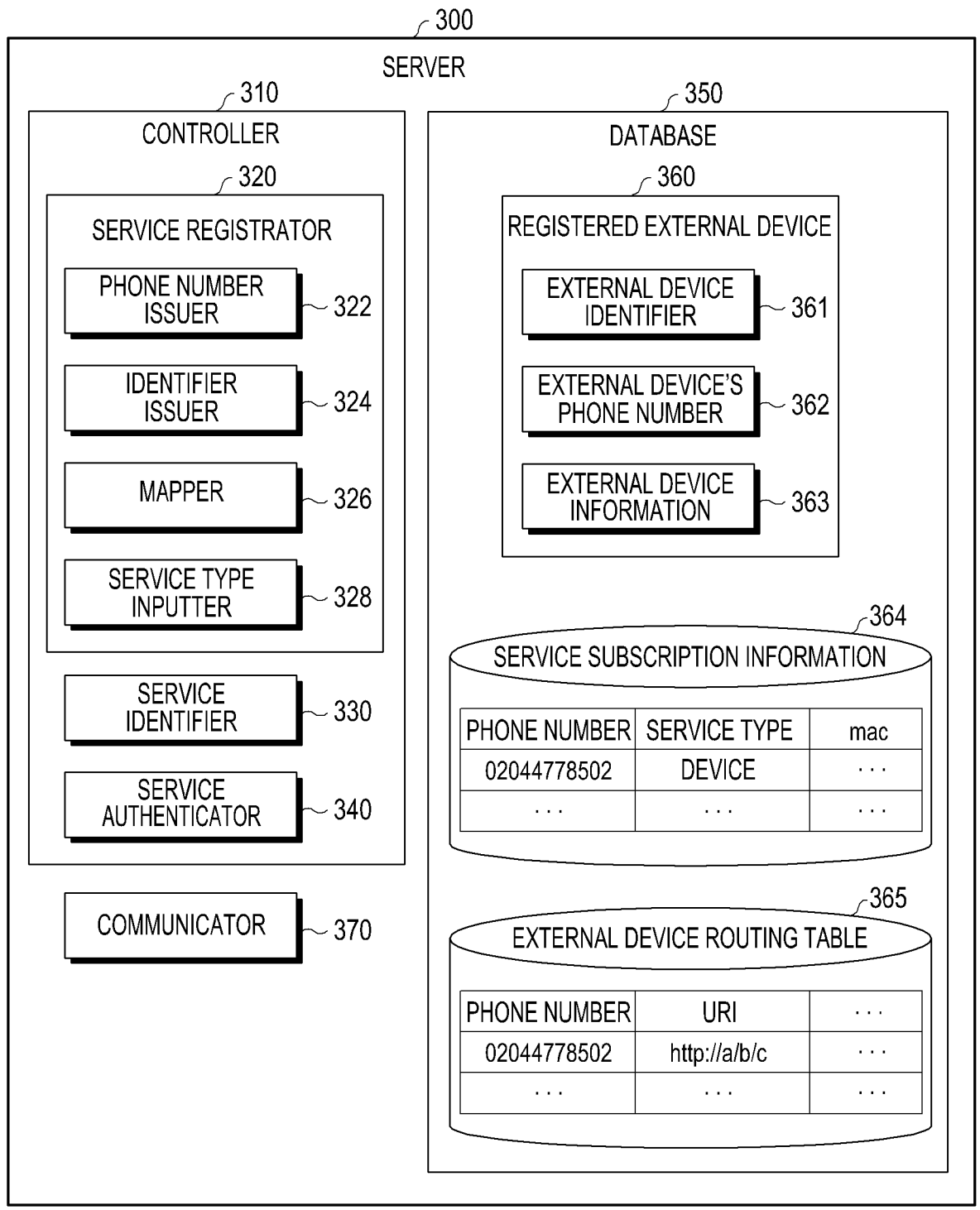
FIG. 3 is a block diagram of a server that is connected to an external device using a phone number, according to an exemplary embodiment.

FIG. 3 is a block diagram of a server that is connected to an external device using a phone number according to an exemplary embodiment. A phone number is a number of a device which is capable of establishing a connection over a mobile network.

The server 300 may include a controller 310 and a database 350. The controller 310 may include a service registrator 320, a service identifier 330, and a service authenticator 340. However, the service registrator 320, the service identifier 330 and the service authenticator 340 may be configured separately from the controller 310. The service registrator 320 may register the external device in the control service provided in the server 300. An identifier issuer 324 in the server 300 may issue an external device identifier corresponding to the external device. A mapper 326 in the server 300 may match a phone number of the external device to the issued identifier. The database 350 may include a database that stores data 360 about the registered external device. For example, data 360 about the registered external device may include an external device identifier 361, external device phone number 362, and external device information 363. The database 350 may store therein, service subscription information 364 and an external device routing table 365. The service subscription information 364 may include a phone number, a service type and Media Access Control (MAC) information of the external device. The external device routing table 365 may include or store therein, a phone number and a Uniform Resource Identifier (URI) of the external device. The server 300 according to another exemplary embodiment may include a communicator 370. The communicator 370 may be connected to the electronic device 100 and the external device 200 over a predetermined network, to transmit and receive a variety of data to/from them.

Figure 4:
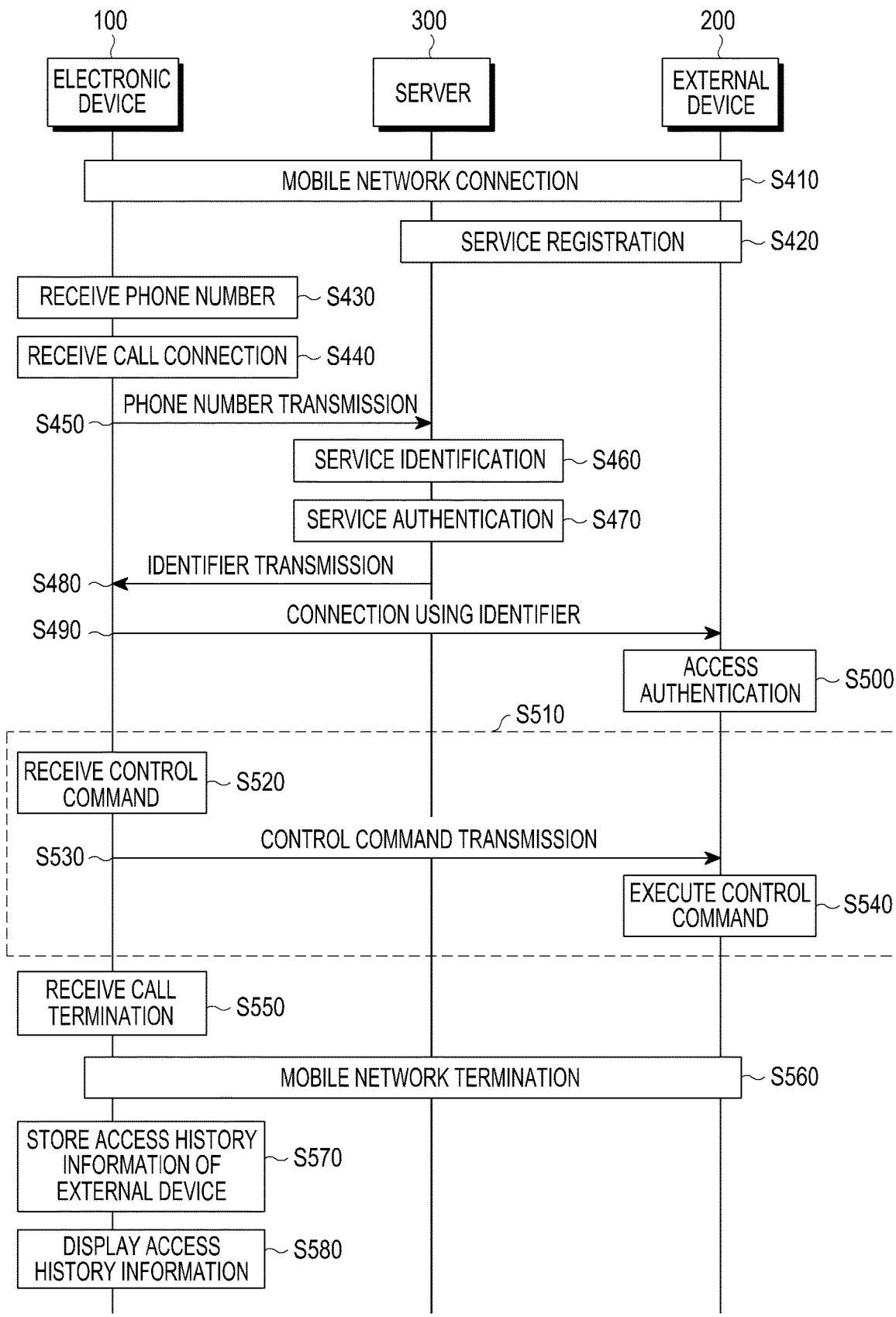
FIG. 4 is a flowchart illustrating a method of controlling an external device using a phone number, according to an exemplary embodiment.

FIG. 4 is a flowchart illustrating a method of controlling an external device using a phone number according to an exemplary embodiment.

Figure 5:
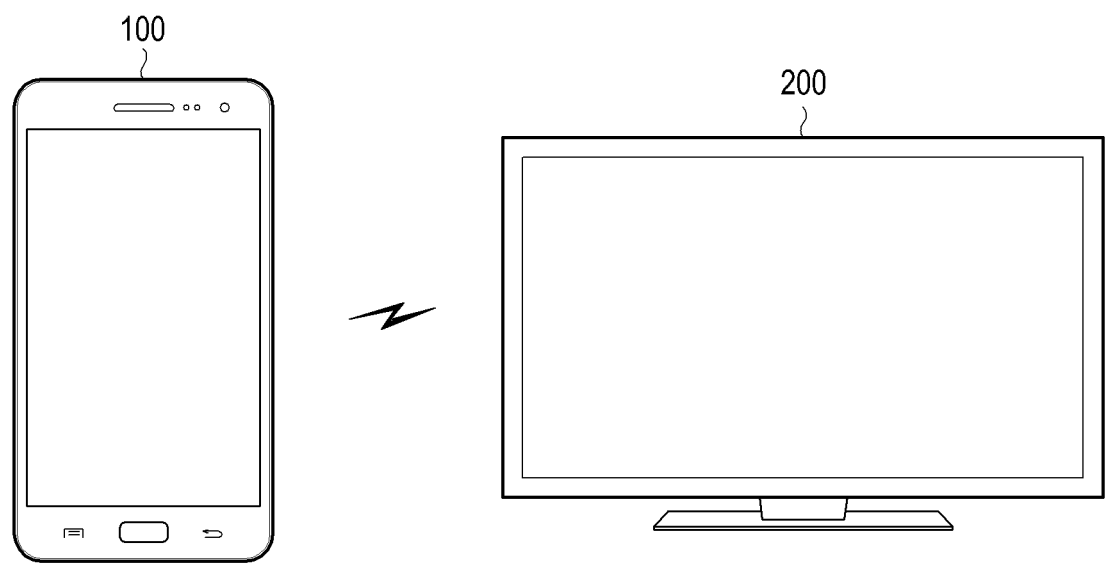
FIG. 5 illustrates an example of an electronic device and an external device in a method of controlling the external device using a phone number, according to an exemplary embodiment.

Referring to FIG. 4, in a method of controlling an external device using a phone number according to an exemplary embodiment, the electronic device 100, the external device 200 and the server 300 may be connected to the mobile network in operation S410. Therefore, the electronic device 100, the external device 200 and the server 300 may access the Internet over the mobile network. The electronic device 100 and the external device 200 may establish an Internet connection over the mobile network, since the electronic device 100 and the external device 200 are assigned their own IP addresses. FIG. 5 illustrates an example of an electronic device and an external device in a method of controlling an external device using a phone number according to an exemplary embodiment. Referring to FIG. 5, the electronic device 100 may be, for example, a mobile device, and the external device 200 may be, for example, a TV. Thus, as described below, the electronic device 100 may control the external device 200 using a phone number.

Next, in operation S420, the external device 200 may be registered in the control service provided in the server 300. In other words, the external device 200 may be registered in the server 300 in relation to the control service. The registration may mean that the control service can be executed in the external device 200. The external device 200 may be registered in the control service provided in the server 300 by the service registrator 320 included in the server 300.

A processor 210 of the external device 200 may send a registration request for the control service to the server 300. In addition, a registration request for the control service may be made even by another device other than the external device 200 in which the control service is provided. For example, if the external device 200, in which the control service is provided, is a TV, a registration request for the control service may be made by a PC which is a device other than the TV which is the external device 200. Therefore, a registration request for the control service may be made not only by the external device 200 in which the control service is provided, but also by a separate device. The process in which a registration request for the control service is made by the separate device may be the same as the process in which the registration request for the control service is made in operation S420 by the external device 200 in which the control service is provided.

The server 300 may form a screen for registration of the control service. The server 300 may transmit the screen for registration of the control service to the external device 200.

Figure 6B:
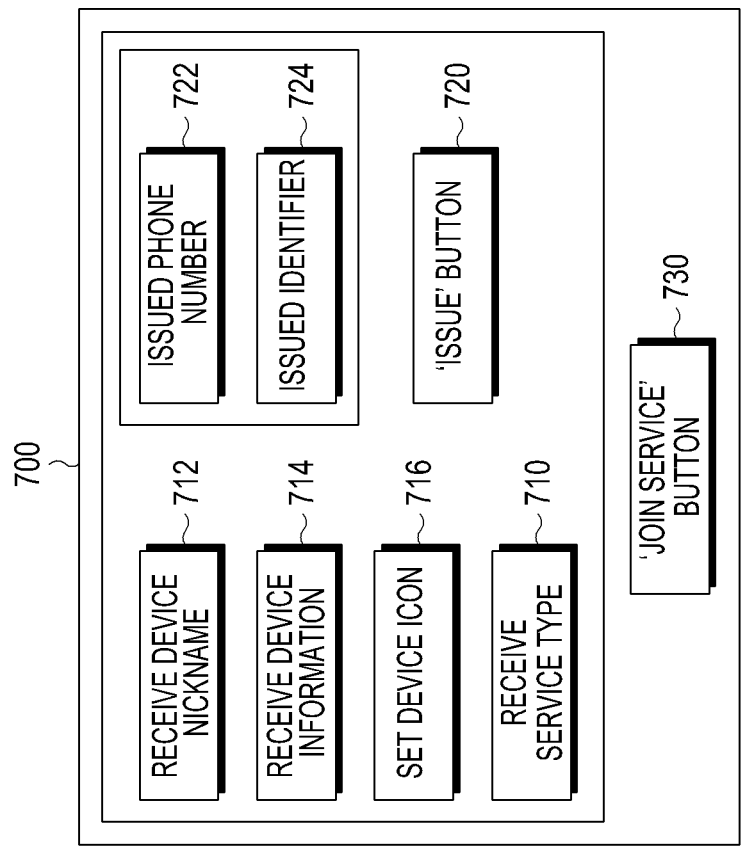
FIGS. 6A and 6B illustrate screens for registration of a control service in a method of controlling an external device by using a phone number, according to an exemplary embodiment.
Figure 6A:
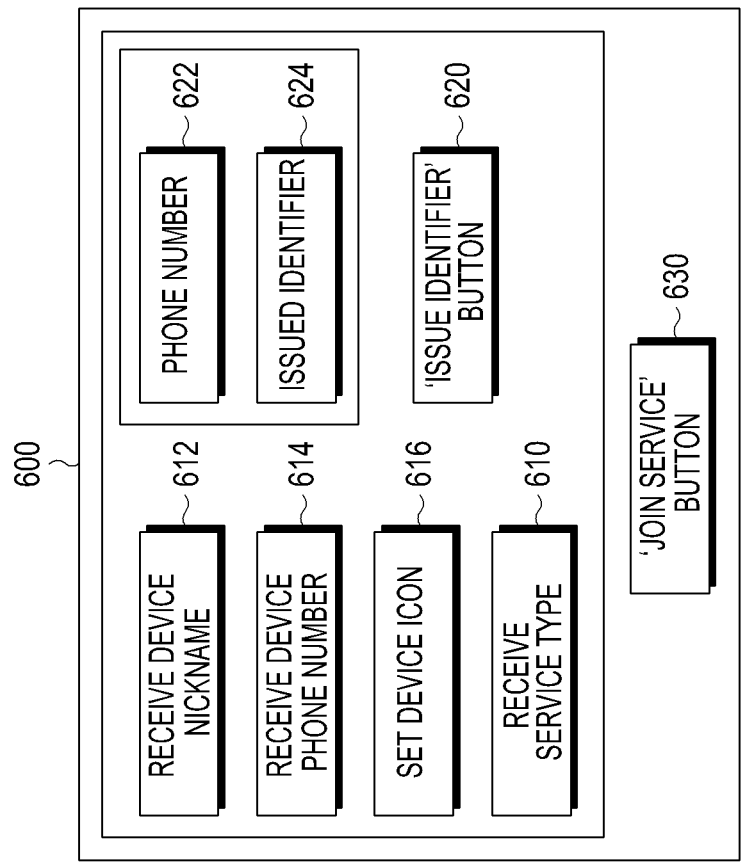

For example, the screen for registration of the control service may be formed as shown in FIGS. 6A and 6B. FIGS. 6A and 6B illustrate screens 600 and 700 for registration of a control service in a method of controlling an external device using a phone number, according to an exemplary embodiment.

FIG. 6A illustrates a screen 600 for registration of the control service for an external device that includes a phone number. FIG. 6B illustrates a screen 700 for registration of a control service for an external device that does not include a phone number and receives a phone number issued by the server 300.

Referring to FIG. 6A, the screen 600 for registration of the control service may include windows for receiving inputs for a nickname 612, a phone number 614, an icon 616 and a service type 610 of the external device. In addition, the screen 600 for registration of the control service may include a 'Join Service' button (or a service subscription button) 630. The screen 600 for registration of the control service may further include a phone number 622, an issued identifier 624 and an 'Issue Identifier' button 620 of the external device.

The processor 210 of the external device 200 may receive each of the nickname 612, the phone number 614, the icon 616 and the service type 610 of the external device through the windows for receiving inputs for the nickname 612, the phone number 614, the icon 616 and the service type 610 of the external device. The nickname 612 of the external device may mean a name of the external device which the user selects for the device. The phone number 614 may mean a phone number which is included in the external device. The icon 616 may mean an image icon which represents the external device. The service type 610 may mean a type of the service in which the external device can be controlled by the electronic device. For example, the service type may be 'TV Monitor', 'Whiteboard', and 'Video Share'.

The processor 210 of the external device 200 may receive a registration request for the control service of the external device 200 in response to selection of the 'Join Service' button 630 on the screen for registration of the control service. In other words, the processor 210 of the external device 200 may start sending a registration request for the control service to the server 300, upon detecting the selection of the 'Join Service' button 630.

The processor 210 of the external device 200 may send an issuance request for an identifier to the server 300 in response to selection of the 'Issue Identifier' button 620. In other words, the processor 210 of the external device 200 may start sending an issuance request for an identifier to the server 300, upon detecting the selection of the 'Issue Identifier' button 620. The processor 210 of the external device 200 may display the phone number 622 and the issued identifier 624 of the external device.

Referring to FIG. 6B, the screen 700 for registration of the control service may include windows for receiving inputs for a nickname 712, an identifier 714, an icon 716 and a service type 710 of the external device. In addition, the screen 700 for registration of the control service may include a 'Join Service' button 730. The screen 700 for registration of the control service may further include an issued phone number 722, an issued identifier 724 and an 'Issue' button 720 of the external device.

The processor 210 of the external device 200 may receive each of the nickname 712, the identifier 714, the icon 716 and the service type 710 of the external device through the windows for receiving inputs for the nickname 712, the identifier 714, the icon 716 and the service type 710 of the external device. The nickname 712 of the external device may mean a name of the external device that the user selects for the device. The identifier 714 may be information (e.g., MAC or IP) which identifies the external device 200. The icon 716 may mean an image icon representing the external device. The service type 710 may mean a type of service in which the external device can be controlled by the electronic device. For example, the service type may be 'TV Monitor', 'Whiteboard', and 'Video Share'.

The processor 210 of the external device 200 may receive a registration request for the control service of the external device 200 in response to selection of the 'Join Service' button 730 on the screen for registration of the control service. In other words, the processor 210 of the external device 200 may start sending a registration request for the control service to the server 300, upon detecting the selection of the 'Join Service' button 730.

The processor 210 of the external device 200 may receive an issuance request for a phone number and an identifier to the server 300 in response to selection of the 'Issue' button 720. In other words, the processor 210 of the external device 200 may start sending an issuance request for a phone number and an identifier to the server 300, upon detecting the selection of the 'Issue' button 720. The processor 210 of the external device 200 may display the issued phone number 722 and the issued identifier 724.

The identifier issuer 324 in the server 300 may issue an external device identifier corresponding to the external device. For example, the identifier may be a URI or an IP. The URI may be a unique address representing the resources existing on the Internet. The existence of the URI is the basic condition required in the Internet, and the URI may always be attached to the IP. Therefore, if the identifier such as the URI is issued for the external device 200, the identifier such as the URI may indicate the external device 200 in the Internet connection over the mobile network. Therefore, using the identifier issued for the external device 200, the electronic device 100 may be directly connected to the external device 200 over the mobile network.

The mapper 326 in the server 300 may match a phone number of the external device to the issued identifier. Therefore, even if the electronic device 100 uses only the phone number of the external device 200, the electronic device 100 may access the identifier of the external device 200. The processor 210 of the external device 200 may store the phone number of the external device 200 and the issued identifier, which are mapped to each other, in the database 350 of the server 300.

If a phone number is not included in the external device 200, a phone number issuer 322 in the server 300 may issue an external device's phone number which corresponds to the external device 200. The server 300 may store the issued external device's phone number in the database 350. Therefore, the mapper 326 in the server 300 may match the issued phone number of the external device 200 to the issued identifier. Thus, even if the electronic device 100 uses only the issued phone number of the external device 200, the electronic device 100 may access the identifier of the external device 200. The processor 210 of the external device 200 may store the issued phone number of the external device 200 and the issued identifier, which are mapped to each other, in the database 350 of the server 300.

The server 300 also includes a service type inputter 328.

Therefore, the server 300 may register the external device 200 in the control service in response to the registration request for the control service from the external device 200.

In FIG. 5, a TV is shown as an example of external device 200. Windows for receiving inputs for the nickname 712, the identifier 714, the icon 716 and the service type 710 of the external device may be displayed on the TV screen, for the external device 200 such as the TV. The nickname 712 of the external device may be entered as 'Albert DTV', and the service type 710 may be entered as 'TV Monitor', 'Whiteboard', or 'Video Share'. The processor 210 of the TV 200 may start sending a registration request for the control service to the server 300, upon detecting the selection of the 'Join Service' button 730. The processor 210 of the TV 200 may start sending an issuance request for a phone number and an identifier to the server 300, upon detecting the selection of the 'Issue' button 720. The identifier issuer 324 in the server 300 may issue an external device identifier corresponding to the TV. The phone number issuer 322 in the server 300 may issue a phone number such as '02044778502' corresponding to the TV. The mapper 326 in the server 300 may match the issued phone number of the TV to the issued identifier. The server 300 may register the TV 200 in the control service in response to the registration request for the control service of the TV 200.

Next, in operation S430, the electronic device 100 may receive an outgoing phone number (or a phone number to be dialed) that is input by the user of the device. The processor 110 of the electronic device 100 may receive the outgoing phone number.

Figure 8A:
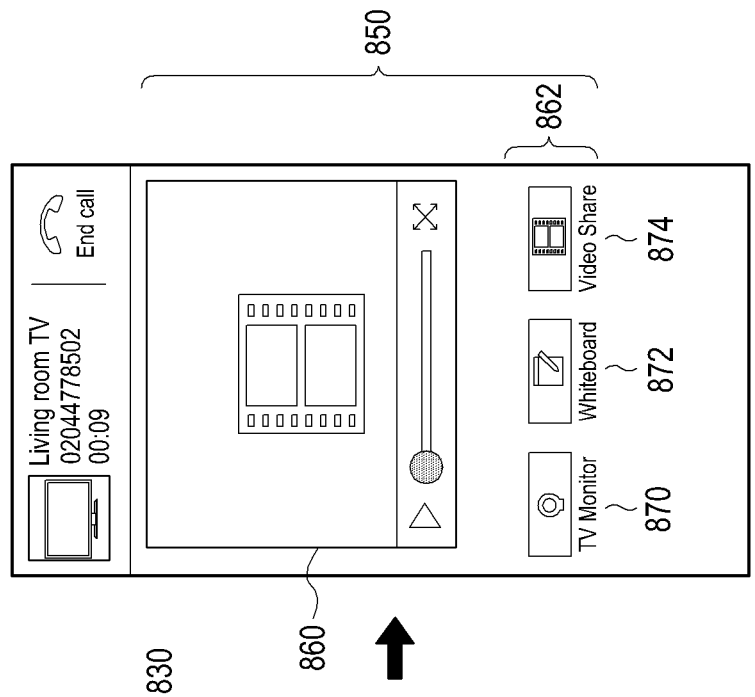

FIGS. 8 and 9 illustrate screens of an electronic device and an external device, which are implemented in a method of controlling an external device using a phone number, according to an exemplary embodiment. For example, referring to FIG. 8A, the processor 110 of the electronic device 100 may run a phone application. The processor 110 may receive the outgoing phone number by detecting an input of dial buttons included in the phone application. For example, as shown in FIG. 8A, the processor 110 may receive an outgoing phone number such as '02044778502' 800. The processor 110 may extract and display, from the memory 140, the caller name corresponding to the outgoing phone number '02044778502' 800. Further, as shown in FIG. 8A, the processor 110 may extract and display, from the memory 140, the caller name (e.g., 'Albert DTV' 810) which corresponds to outgoing phone number s '02044778502' 800.

Next, in operation S440, the electronic device 100 may receive a call connection that is input by the user. In other words, the processor 110 of the electronic device 100 may receive the call connection. For example, the processor 110 may receive the call connection by receiving an input from the call icon 820 included in the phone application. As shown in FIG. 8A, the processor 110 may receive an input for a selection of a call icon 820 included in the phone application. The processor 110 may receive the call connection by detecting an input which selects the call icon 820.

Next, in operation S450, the electronic device 100 may transmit the input phone number to the server 300 over the mobile network. The processor 110 of the electronic device 100 may transmit the input phone number 800 to the server 300 over the mobile network. For example, as shown in FIG. 8A, the input phone number 800 may be '02044778502' 800. The processor 110 of the electronic device 100 may transmit the input phone number 800 such as '02044778502' to the server 300 over the mobile network.

Next, in operation S460 (or in the service identification operation), the server 300 may determine whether the input phone number is the same as a phone number of the registered external device 200. In other words, the controller 310 of the server 300 may determine whether the input phone number is the same as a phone number of the external device 200, which is registered in the database 350.

The controller 310 of the server 300 may extract, from the database 350, the phone number of the external device 200 registered in the control service provided in the server 300.

The controller 310 of the server 300 may determine whether the phone number of the external device 200 registered in the control service, which is extracted from the database 350, is the same as the phone number received from the electronic device 100.

For example, with respect to the TV 200 which is the external device 200 shown in FIG. 5, in operation S420, the phone number that is extracted from the database 350 for the TV 200 may be '02044778502'. In FIG. 8A, the phone number received from the electronic device 100 may be '02044778502'. Therefore, the controller 310 of the server 300 may determine that the phone number of the external device 200 registered in the control service, which is extracted from the database 350 in FIG. 3, is the same as the phone number that is received from the electronic device 100 in FIG. 8A.

Next, in operation S470 (or in service authentication operation), if the input phone number is the same as the phone number of the registered external device, then the server 300 may perform authentication for the input phone number. In other words, if the input phone number is the same as the phone number of the registered external device, the controller 310 of the server 300 may perform authentication for the input phone number.

For example, since the phone number that is received from the electronic device 100 in FIG. 8A is the same as the phone number '02044778502' of the TV 200, which is extracted, the controller 310 of the server 300 may perform authentication for the input phone number '02044778502'. Therefore, the phone number corresponding to '02044778502' may be the authenticated phone number.

Next, in operation S480, if the service authentication is performed for the input phone number, the server 300 may transmit an identifier of the registered external device 200. In other words, if the service authentication is performed for the input phone number, the controller 310 of the server 300 may extract an identifier of the registered external device 200 from the database 350 and transmit the extracted identifier. The processor 110 of the electronic device 100 may store the received identifier of the external device 200 in the memory 140.

For example, since authentication has been performed for the phone number s '02044778502' shown in FIG. 8A, the controller 310 of the server 300 may extract a URI of the TV 200, shown in FIG. 5, which corresponds to the phone number '02044778502', from the database 350, and transmits the extracted URI. Therefore, the processor 110 of the electronic device 100 may receive an identifier of the TV 200 from the server 300.

Next, in operation S490, the electronic device 100 may send a connection request to the external device 200 over the mobile network using the received external device identifier. In other words, the processor 110 of the electronic device 100 may send a connection request to the external device 200 over the mobile network using the received external device identifier.

For example, if the received external device identifier is the identifier of the TV 200 shown in FIG. 5, the processor 110 of the electronic device 100 in FIG. 8A may send a connection request to the external device 200 which corresponds to the TV 200 over the mobile network using the identifier such as the URI.

Therefore, according to an exemplary embodiment, the electronic device 100 may send a connection request to the external device 200 using the phone number of the registered external device, which is issued in the server 300. In addition, according to an exemplary embodiment, the electronic device 100 may send a connection request to the external device 200 using the identifier of the external device 200, making it possible to automatically make a connection request to the external device 200 without requiring user intervention.

Next, in operation S500, the external device 200 may perform access authentication with the electronic device 100. In other words, the processor 210 of the external device 200 may perform access authentication with the electronic device 100.

Figure 7:
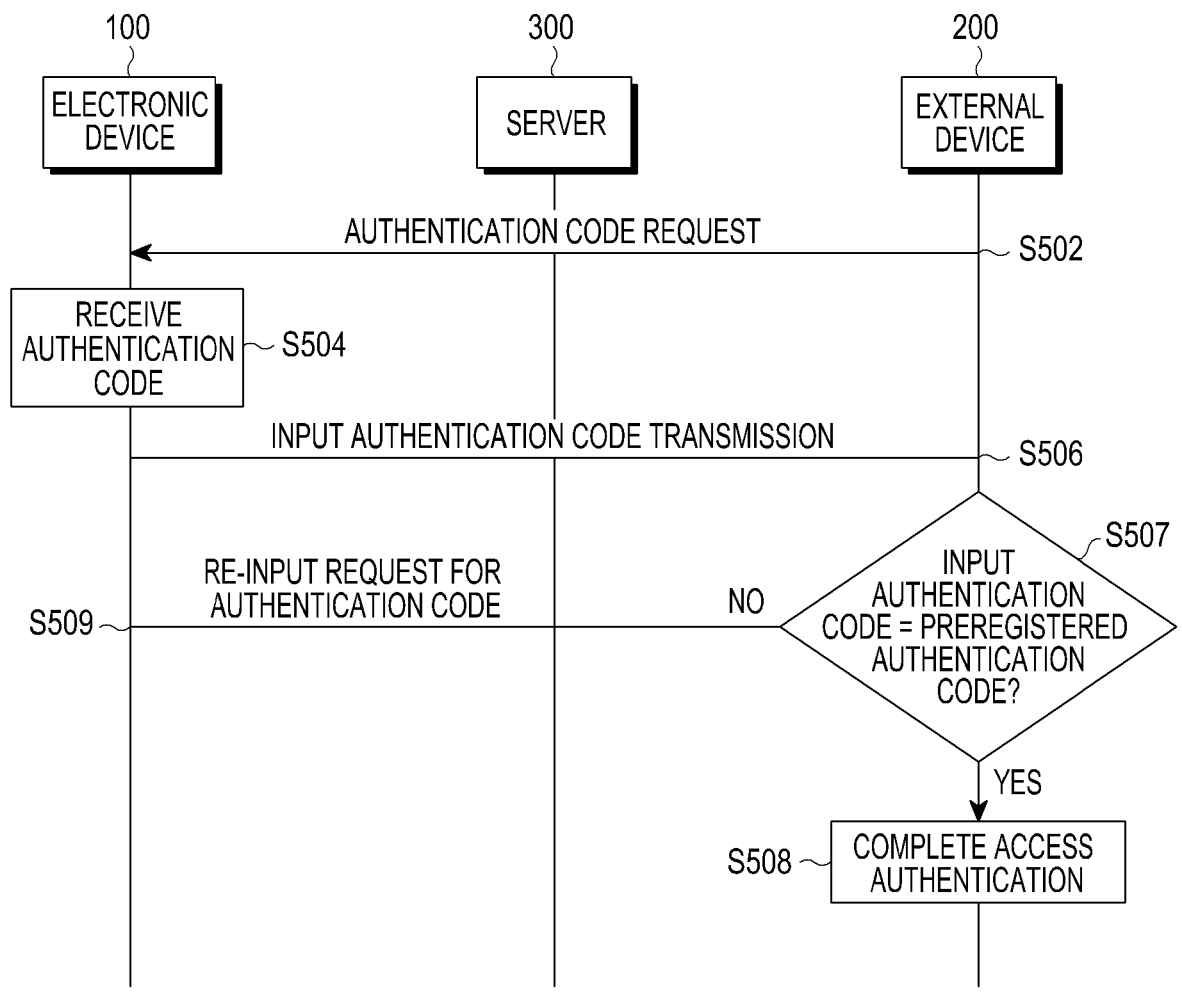
FIG. 7 is a detailed flowchart illustrating a process of performing access authentication for an electronic device according to an exemplary embodiment.

FIG. 7 is a detailed flowchart illustrating a process of performing access authentication with an electronic device according to an exemplary embodiment. In other words, FIG. 7 is a detailed flowchart for operation S500 in FIG. 4. Therefore, the access authentication process will be described in more detail with reference to FIG. 7.

At operation S502, the electronic device 100 may receive a request for an authentication code from the external device 200. In other words, the processor 210 of the external device 200 may send a request for an authentication code to the electronic device 100.

Figure 8B:
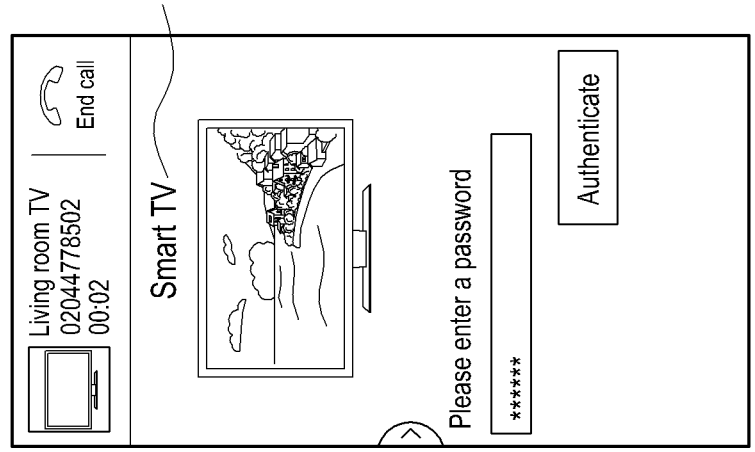

Next, in operation S504, the electronic device 100 may receive an authentication code that is input by the user. The processor 110 of the electronic device 100 may display a window through which the electronic device 100 has received the authentication code. For example, as shown in FIG. 8B, the processor 110 may display a window in which the electronic device 100 has received the authentication code. In other words, the processor 110 of the electronic device 100 may display an item 840 through which the electronic device 100 receives the authentication code (or a password). The processor 110 may receive the authentication code through an input for the item 840. For example, the authentication code (or a password) may be a combined code of numbers, letters and symbols, such as '12345#abd'. As shown in FIG. 8B, the processor 110 may display information 830 (e.g., the type or image of the device) about the external device 200.

Next, in operation S506, the electronic device 100 may transmit the input authentication code to the external device 200. In other words, the processor 110 of the electronic device 100 may transmit the input authentication code to the external device 200.

Next, in operation S507, the external device 200 may determine whether the input authentication code is the same as the preregistered authentication code. In other words, the processor 210 of the external device 200 may determine whether the input authentication code is the same as the preregistered authentication code. The preregistered authentication code may be input in advance in association with the external device 200, and then stored in the database 350. Therefore, the processor 210 of the external device 200 may determine whether the input authentication code received from the electronic device 100 is the same as the preregistered authentication code extracted from the database 350.

Next, in operation S508, if the input authentication code is the same as the preregistered authentication code, the external device 200 may complete the access authentication. In other words, if the input authentication code is the same as the preregistered authentication code, the processor 210 of the external device 200 may complete the access authentication. In other words, since the case where the input authentication code is the same as the preregistered authentication code corresponds to the case where the access authentication is successful, the processor 210 of the external device 200 may complete the access authentication. Thereafter, the processor 210 may proceed to operation S510 which is the next operation.

However, in operation S509, if the input authentication code is not the same as the preregistered authentication code, the external device 200 may send a re-input request for an authentication code to the electronic device 100. If the input authentication code is not the same as the preregistered authentication code, the processor 210 of the external device 200 may not allow the access authentication. Therefore, the processor 210 of the external device 200 may send a re-input request for an authentication code to the electronic device 100. In this case, the electronic device 100 may return to operation S504 and receive another authentication code that is re-input by the user. Thereafter, the external device 200 may proceed again to operations S506 to S508.

Therefore, according to an exemplary embodiment, the electronic device 100 may request control of the external device 200 by performing access authentication with the external device 200.

Next, referring back to FIG. 4, in operation S510, upon receiving an indication from the external device 200 that access authentication is completed, the electronic device 100 may control the external device 200 by sending a control command to the external device 200.

In other words, in operation S520, upon receiving an indication from the external device 200 that access authentication is completed, the processor 110 of the electronic device 100 may receive a control command that is input by the user. The processor 110 of the electronic device 100 may receive a control command through a control menu. In other words, the processor 110 of the electronic device 100 may display the control menu on the display 130.

Figure 8C:
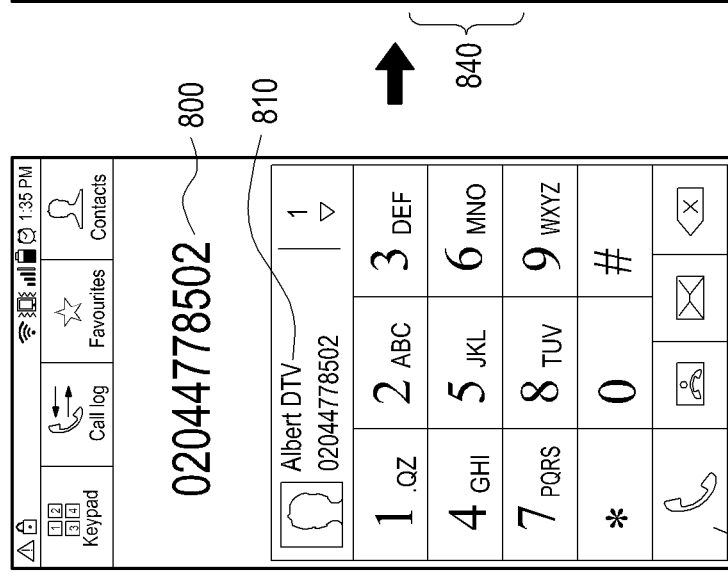

For example, as shown in FIG. 8C, the processor 110 of the electronic device 100 may display a control menu 850 on the display 130. In this case, the processor 110 may display the control menu 850 including a service type 862 on the display 130. For example, the service type 862 may be 'TV Monitor' 870, 'Whiteboard' 872 and 'Video Share' 874. In this case, the processor 110 may display an icon corresponding to each of the service types.

Next, in operation S530, the electronic device 100 may send the control command to the external device 200. In other words, the processor 110 of the electronic device 100 may receive the control command that is input by the user. The processor 110 of the electronic device 100 may send the input control command to the external device 200.

For example, the processor 110 may receive the control command by receiving an input for a selection of an icon for the service type included in the control menu. As shown in FIG. 8C, the processor 110 may receive the control command by receiving an input for a selection of any one of icons 870, 872 and 874 for the service types included in the control menu 862. For example, the processor 110 may receive an input for a selection of the icon 870 for the service type 'TV Monitor'. In this case, as the display 130 of the electronic device 100 is formed as a touch screen, the processor 110 may receive an input for a selection of the service type 'TV Monitor' by detecting a touch on the icon 870 for the service type such as 'TV Monitor'. Therefore, the processor 110 may receive the control command to execute the service type 'TV Monitor' by receiving an input for a selection of the service type 'TV Monitor'. In other words, the processor 110 may receive the control command to execute the service type 'TV Monitor' in the external device 200. The processor 110 of the electronic device 100 may transmit the input control command to the external device 200. In other words, the processor 110 of the electronic device 100 may transmit the control command to execute the service 'TV Monitor' to the external device 200.

Next, in operation S540, the external device 200 may execute the control command. In other words, the processor 210 of the external device 200 may execute the control command received from the electronic device 100.

Figure 9B:
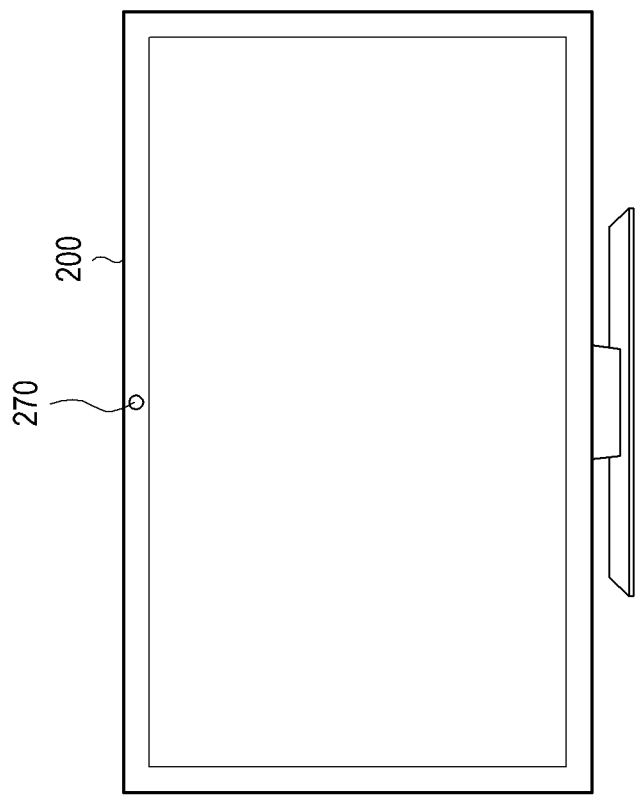
Figure 9A:
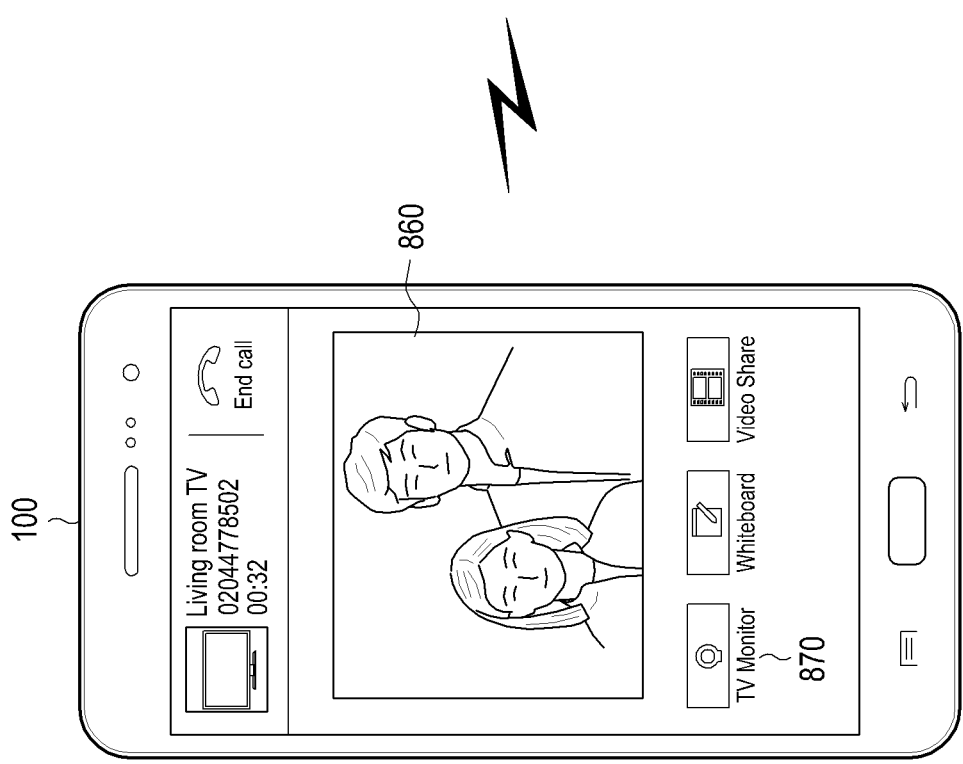

For example, if the processor 210 of the external device 200 receives the control command to execute the service type 'TV Monitor,' shown in FIG. 8C, the processor 210 of the external device 200 may execute the control command to execute the service type 'TV Monitor' as shown in FIGS. 9A and 9B. Referring to FIGS. 9A and 9B, the processor 210 of the external device 200, such as the 'TV,' may execute the control command 'TV Monitor'. The service type 'TV Monitor' may mean a service in which 'TV' corresponding to the external device 200 can be used as a monitor. In other words, the service type 'TV Monitor' may mean a service in which an image or video captured by a camera 270 included in 'TV,' which corresponds to the external device 200, can be displayed on the electronic device 100. In other words, as shown in FIG. 9A, if the service type 'TV Monitor' is used, an image or video 860 captured by the camera 270 included in 'TV,' which corresponds to the external device 200, may be displayed on the display 130 of the electronic device 100. Therefore, the user of the electronic device 100, such as a mobile device, may recognize the image or video 860 captured by the camera 270 of the 'TV' 200, on the display 130 of the electronic device 100. In other words, the user of the mobile device may recognize in real time the image or video 860 captured by the camera 270 of the TV that is present in the remote location.

Figure 11B:
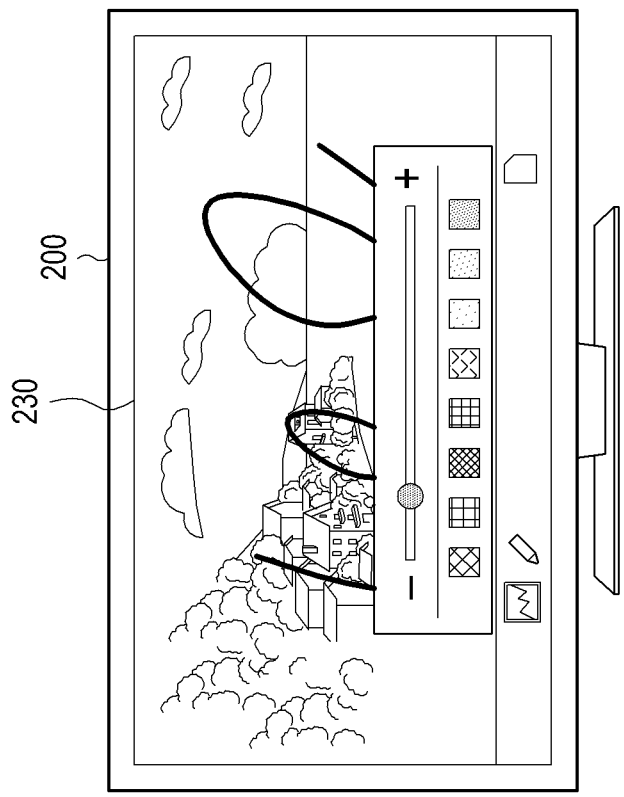
Figure 11A:
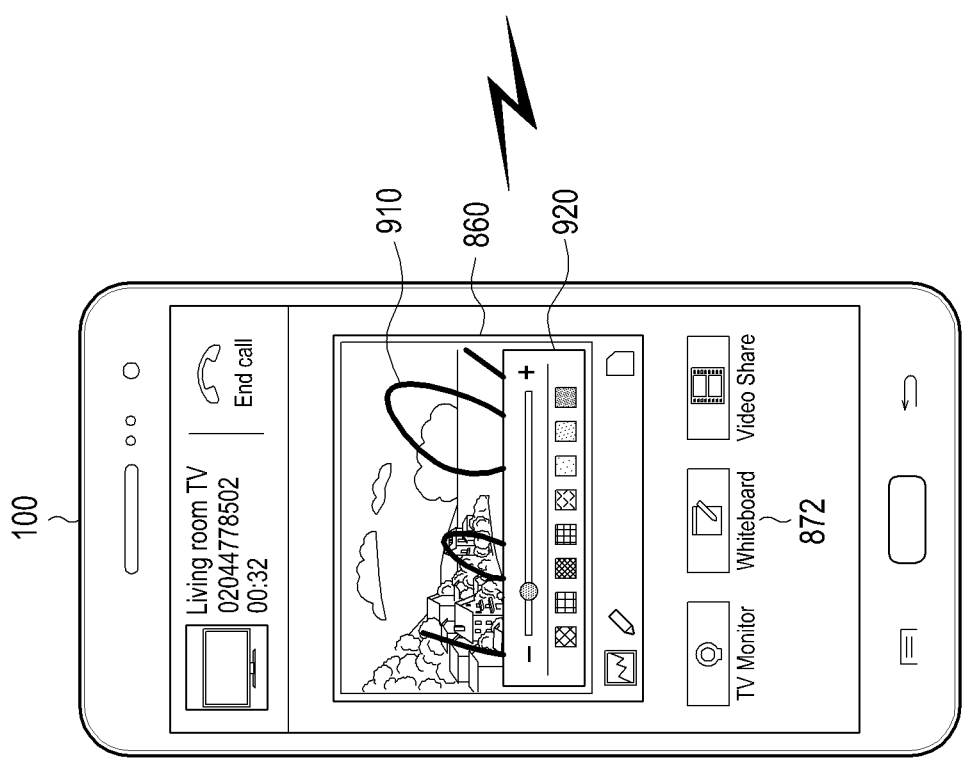

As another example, if the processor 210 of the external device 200 receives the control command to execute the service type 'Whiteboard' 872 in FIG. 8C, the processor 210 of the external device 200 may execute the control command to execute the service type 'Whiteboard' as shown in FIGS. 10A, 10B, 11A and 11B. Referring to FIGS. 10A and 10B, the processor 210 of the external device 200, such as a TV, may execute the control command 'Whiteboard' 872. In this case, the service type 'Whiteboard' may mean a service in which the display 130 of the electronic device 100 is used as a whiteboard to display the notes that are input on the whiteboard, and the notes that are input on the electronic device 100 appear on a display 230 of the external device 200 in the same way in real time. Referring to FIG. 10A, the notes that are input on a whiteboard window 860 included in the display 130 of the electronic device 100, such as a mobile device, may be displayed on the display 230 of the external device, such as TV, in the same way. In other words, if notes are made on the whiteboard window 860 included in the display 130 of the electronic device 100, such as a mobile device, the processor 110 of the electronic device 100 may transmit the data relating to the notes to the external device 200. The external device 200 may display the received notes on the display 230, the same way and in real time. Referring to FIGS. 11A and 11B, editing relating to the notes may be input in the whiteboard window 860 displayed on the display 130 of the electronic device 100. For example, as shown in FIG. 11A, the editing may be a change 920 in color of an input text 910. In this case, the processor 110 of the electronic device 100 may transmit the data for the editing relating to the notes to the external device 200. By executing the received data for the editing relating to the notes, the external device 200 may edit the notes displayed on the display 230 in real time. Therefore, if the service 'Whiteboard' is used, the user of the electronic device 100, such as a mobile device, may input or make notes on the mobile device 100, and show the notes to the user of the TV 200, which exists in a remote place from the electronic device, in real time. Therefore, if the service 'Whiteboard' is used, the mobile device can be used as a whiteboard that is displayed on the TV which exists remotely from the mobile device.

Figures 13A, 13B:
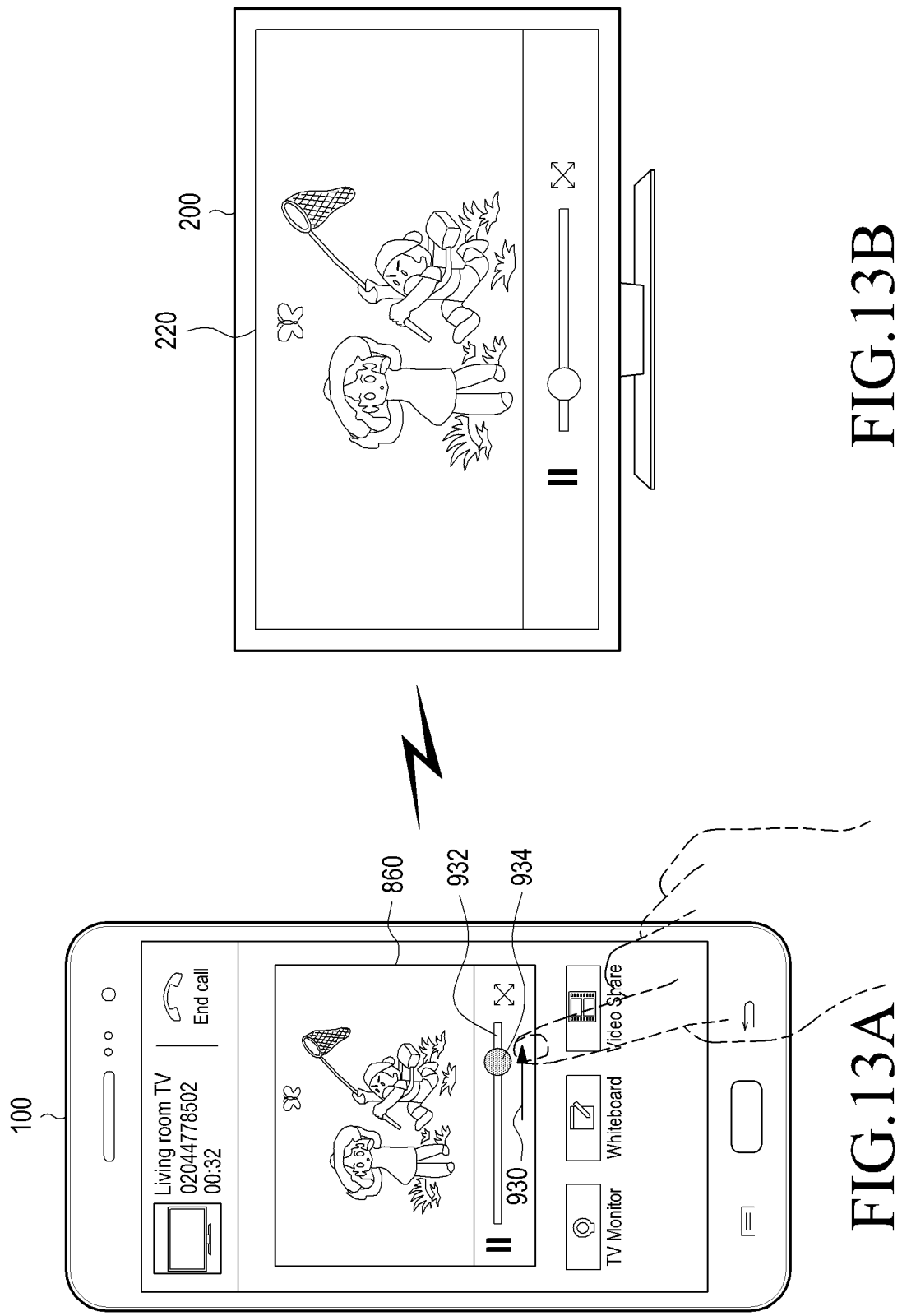

As another example, if the processor 210 of the external device 200 receives the control command to execute the service type 'Video Share' 874, as shown in FIG. 8C, the processor 210 of the external device 200 may execute the control command to execute the service type 'Video Share' as further described in FIGS. 12A, 12B, 13A and 13B. Referring to FIGS. 12A and 12B, the processor 210 of the external device 200, such as a TV, may execute the control command 'Video Share' 874. In this case, the service type 'Video Share' may mean a service in which the video being played on the electronic device 100 is played on the external device 200 in the same way. Referring to FIGS. 13A and 13B, the processor 110 of the electronic device 100, such as a mobile device, may play a video 860. The processor 210 of the external device 200 may execute the control command to execute the service type 'Video Share'. In other words, the processor 210 of the external device 200, such as TV, may play the video 860, which is being played on the electronic device 100, on its display 220 in the same way and in real time. In other words, according to the control command to execute the service type 'Video Share', the electronic device 100 and the external device 200 may play and share the video 860. In addition, as shown in FIGS. 13A and 13B, the processor 110 of the electronic device 100 may receive a playback-related command during playback of the video 860. The playback-related command may include commands such as, Start, Pause, Stop, Forward and Back. In this case, if the playback-related command is input to the electronic device 100, the processor 110 of the electronic device 100 may send the playback-related command to the external device 200. For example, as shown in FIGS. 13A and 13B, the processor 110 of the electronic device 100, such as a mobile device, may receive the playback-related command, such as Forward, by detecting a left-to-right drag 930 for an icon 934 included in a play bar 932. The processor 110 of the electronic device 100 may send the playback-related command, such as Forward, to the external device 200. The processor 210 of the external device 200 may execute the playback-related command such as Forward. Therefore, as shown in FIGS. 13A and 13B, if the playback-related command is input in the electronic device 100, the playback-related command may be executed in the external device 200 in the same way.

Therefore, according to an exemplary embodiment, the electronic device may receive an identifier of the external device based on a phone number of the external device, and control the external device using the identifier of the external device. In particular, according to an exemplary embodiment, since the electronic device can easily start control of the external device using the phone number of the external device, a separate gateway device is not necessary and there is no need to install a separate application.

Next, in operation S550, the electronic device 100 may receive a call termination that is input by the user. In other words, the processor 110 of the electronic device 100 may receive the call termination. For example, the processor 110 may receive the call termination by receiving an input for a selection of an End Call icon included in the phone application.

Next, in operation S560, the electronic device 100 may terminate the connection with the mobile network. If the call termination is input, the processor 110 of the electronic device 100 may terminate the connection with the mobile network. In this case, the processor 110 of the electronic device 100 may terminate the mobile network connection between the server 300 and the external device 200.

Next, in operation S570, the electronic device 100 may store the access history information of the external device 200 in the memory 140. In other words, the processor 110 of the electronic device 100 may store the access history information of the external device 200 in the memory 140. The access history information of the external device 200 may be such information as a phone number, an identifier, a service type, and a connection start and end time of the external device. For example, if the electronic device 100, such as a mobile device, performs the service type 'TV Monitor' 870 with the external device 200, such as TV, as shown in FIGS. 9A and 9B, the processor 110 of the electronic device 100 may store such information as a phone number, an identifier, and a connection start and end time of the external device 200, in the memory 140.

Next, in operation S580, the electronic device 100 may display the access history information on the display 130.

Upon receiving a command to display the access history information, the processor 110 of the electronic device 100 may display the access history information on the display 130. For example, as shown in FIGS. 9A and 9B, upon receiving a command to display the access history information, the processor 110 may display, on the display 130, the access history information such as a phone number, an identifier, and a connection start and end time of the external device 200, such as TV. Therefore, according to an exemplary embodiment, the user of the electronic device 100 may check the access history information of the external device 200 that the user has accessed.

Figures 14A, 14B:
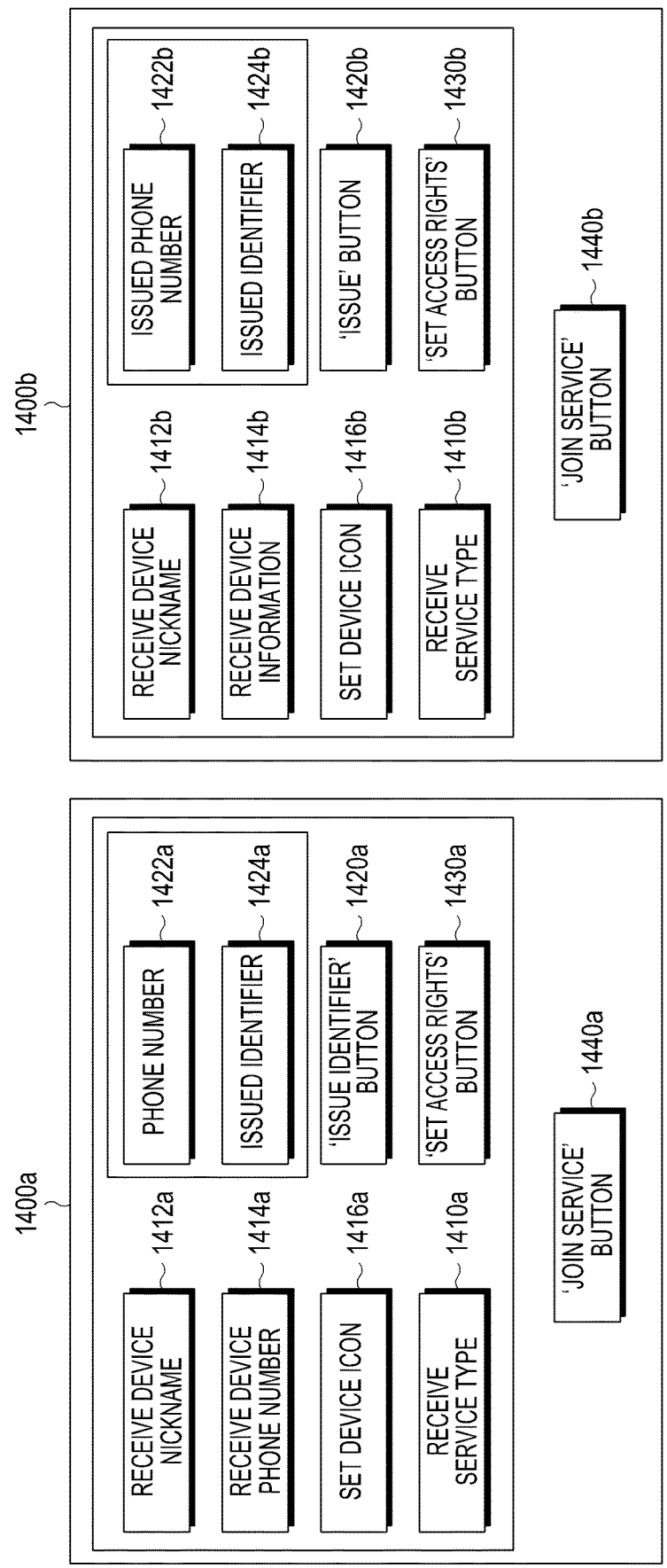
FIGS. 14A and 14B illustrate screens for registration of a control service, according to another exemplary embodiment.

FIGS. 14A and 14B illustrate screens for registration of a control service according to another exemplary embodiment. Referring to FIGS. 14A and 14B, the screens for registration of a control service according to another exemplary embodiment may be displayed on the external device as shown in FIGS. 14A and 14B.

Referring to FIG. 14A, a screen 1400a for registration of the control service may include windows for receiving inputs for a nickname 1412a, a phone number 1414a, an icon 1416a and a service type 1410a of the external device. In addition, the screen 1400a for registration of the control service may include a 'Join Service' button 1440a. The screen 1400a for registration of the control service may further include a phone number 1422a, an issued identifier 1424a and an 'Issue Identifier' button 1420a of the external device. The screen 1400a for registration of a control service according to another exemplary embodiment may further include a 'Set Access Rights' button 1430a. The user who wants to register the external device 200 may set an access group capable of performing the control service, by making access to the external device 200 available by using the 'Set Access Rights' button 1430a. The access group may include, for example, "family", "individual" and "public".

The access group may be specified by the user who desires to register the external device 200. For example, the access group may be set by receiving an input access group (e.g., "family") corresponding to the access rights information after receiving an identification number (e.g., "010-2211-3344"), which is input by the user, of the electronic device 100 that can access the external device 200. The external device 200 may receive and store a list of phone numbers which are grouped and classified by a user terminal (e.g., the electronic device 100), and if the access rights information is input to the external device 200, an access group corresponding to the access rights information may be automatically set depending on the stored phone number list. Herein, various information such as a phone number corresponding to the external device, service subscription information 364, a routing table 365, and access information for controlling the external device 200 as needed may be collectively referred to as 'identification information'.

The "family" as the access group may mean that with respect to the users capable of accessing the external device 200 to control the external device 200, only the family of the user who has registered the control service for the external device 200 can access the external device 200. For example, if the external device 200 is "TV in the living room", the access group may be set as "family" by the user. The "individual" as the access group may mean that only the user himself/herself who registered the control service or only one person specified by the user can access the external device 200. For example, a "laptop computer", in which a variety of personal information of the user is stored, may be set as "individual" by the user. The "public" access group may mean that any user can access the external device 200.

For example, a "public printer" located in the library may be set as "public" by the user who desires to register the external device 200 in the control service. The access groups "family", "individual" and "public" have been illustratively mentioned for convenience of description, but the types of the access groups according to an exemplary embodiment will not be limited thereto.

Referring to FIG. 14B, a screen 1400b for registration of the control service may include windows for receiving inputs for a nickname 1412b, a phone number 1414b, an icon 1416b and a service type 1410b of the external device. In addition, the screen 1400b for registration of the control service may include a 'Join Service' button 1440b. The screen 1400b for registration of the control service may further include an issued phone number 1422b, an issued identifier 1424b, an 'Issue' button 1420b and a 'Set Access Rights' button 1430b of the external device. For the components shown in FIG. 14B, excluding the 'Set Access Rights' button 1430b, the above description made in connection with FIG. 6B may be applied in the same way. In addition, for the function(s) or operation(s) performed by the 'Set Access Rights' button 1430b, the description of the 'Set Access Rights' button 1430a, which has been made in connection with FIG. 14A may be applied in the same way.

Figure 15:
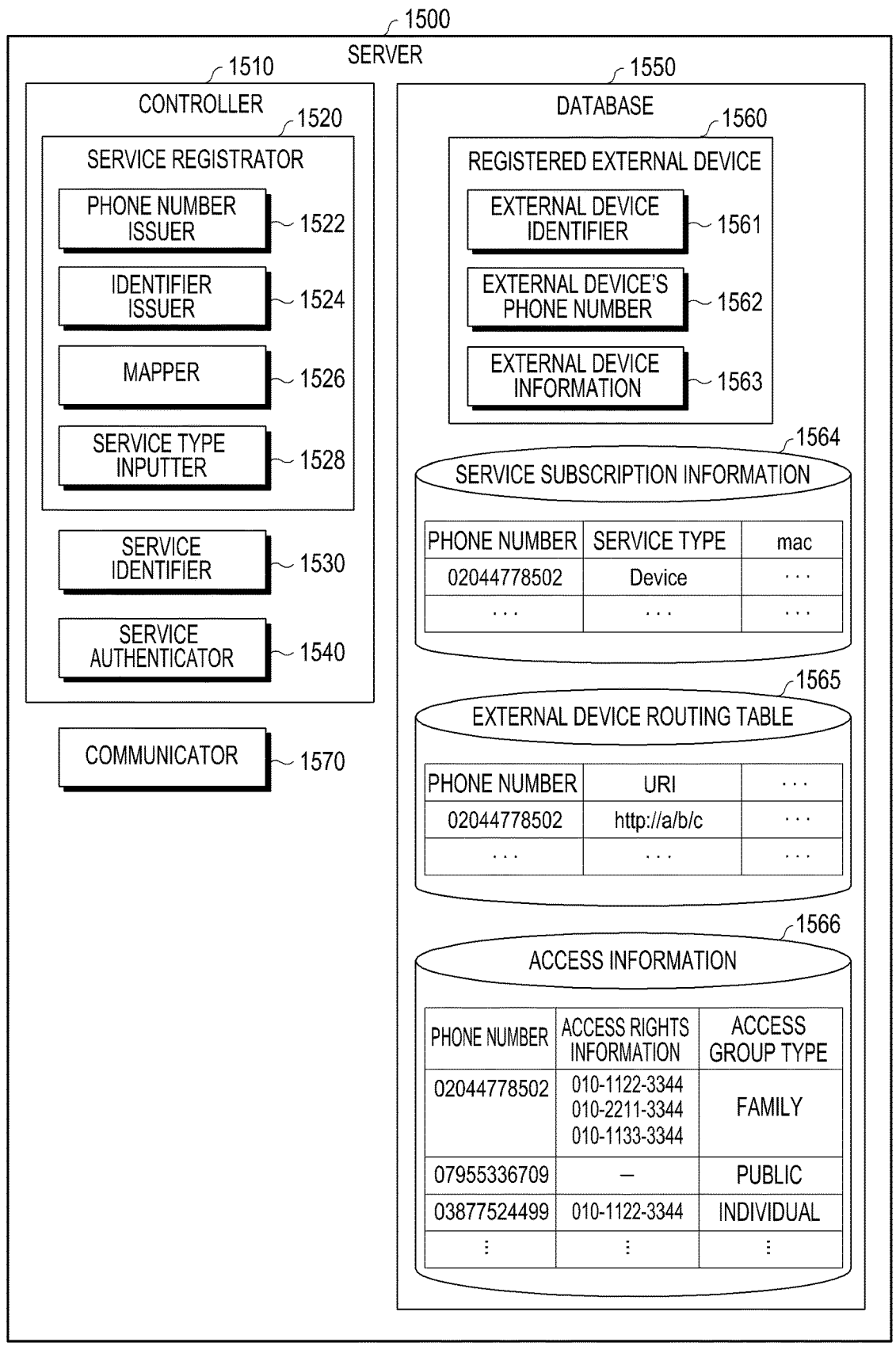
FIG. 15 illustrates a server in which access information is stored according to another exemplary embodiment.

FIG. 15 illustrates a server in which access information is stored according to another exemplary embodiment.

Referring to FIG. 15, a server 1500 according to another exemplary embodiment may include a controller 1510 and a database 1550. The controller 1510 may include a service registrator 1520, a service identifier 1530 and a service authenticator 1540. However, the service registrator 1520, the service identifier 1530 and the service authenticator 1540 may be configured separately from the controller 1510. The service registrator 1520 may register the external device in the control service provided in the server 1500. An identifier issuer 1524 in the server 1500 may issue an external device identifier corresponding to the external device 200. A mapper 1526 in the server 1500 may match a phone number of the external device to the issued identifier. The database 1550 may include a database that stores data 1560 about the registered external device such as external device identifier 1561, external device phone number 1562, and external device information 1563. The server 1500 (or the database 1550) may store therein, service subscription information 1564 and an external device routing table 1565. The service subscription information 1564 may include a phone number, a service type and MAC information of the external device 200. The external device routing table 1565 may include or store therein, a phone number and a URI of the external device 200. The server 1500 according to another exemplary embodiment may include a communicator 1570. The communicator 1570 may be connected to the electronic device 100 and the external device 200 over a predetermined network, to transmit and receive a variety of data to/from them.

The server 1500 according to another exemplary embodiment may store information 1566 (hereinafter referred to as 'access information') related to the access rights setting, in the database 1550. As shown in FIG. 15, the access information may include a phone number indicating the external device 200 which is a control target, an identification number (e.g., a phone number) of an electronic device(s) 100 that is granted access rights to control the external device 200, and an access group's type (e.g., "family", "individual" or "public"). The server 1500 may receive the access rights information and the access group's type from the external device 200. As shown in FIG. 15, the server 1500 may store the received access rights information and the received access group's type to correspond to a phone number of their associated external device 200. In this manner, the type of the access group capable of accessing the external device 200 may be specified according to the access group. As for a function or operation in which the external device 200 is registered in the server 1500, the service registration operation of the external device 200, which has been described in connection with FIGS. 2 to 7, may be applied in the same way.

FIGS. 16A and 16B illustrate a case where an electronic device fails to access an external device based on access information, according to an exemplary embodiment.

Referring to FIG. 16A, if, for example, the electronic device 100 that does not have access rights to the external device 200 selects a Call icon 820 after receiving an input phone number 800 corresponding to the external device (e.g., Albert DTV 810) to control the external device of Albert DTV 810, the electronic device 100 may send an access request to the server (e.g., the server 300). The access request may include an identification number (e.g., a phone number) of the electronic device 100. If the electronic device 100 does not have access rights to the external device of Albert DTV 810, the electronic device 100 may receive an access-denied response from the server 300, and display an access-denied message 880 as shown in FIG. 16B.

Figure 17B:
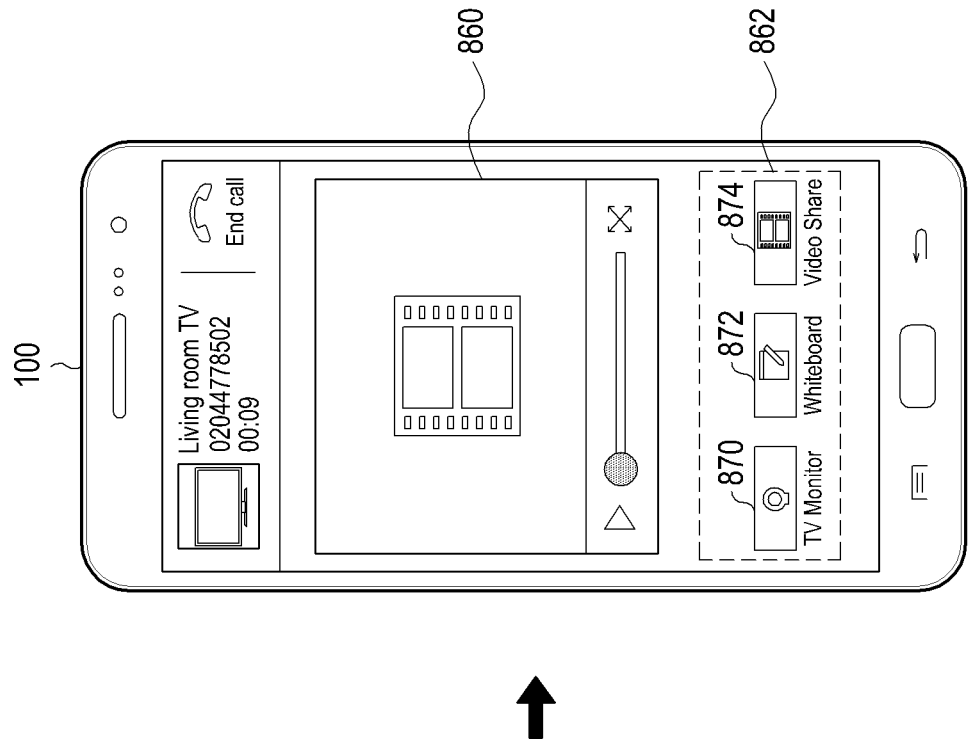
FIGS. 17A and 17B illustrate a case where an electronic device accesses an external device based on access information, according to an exemplary embodiment.
Figure 17A:
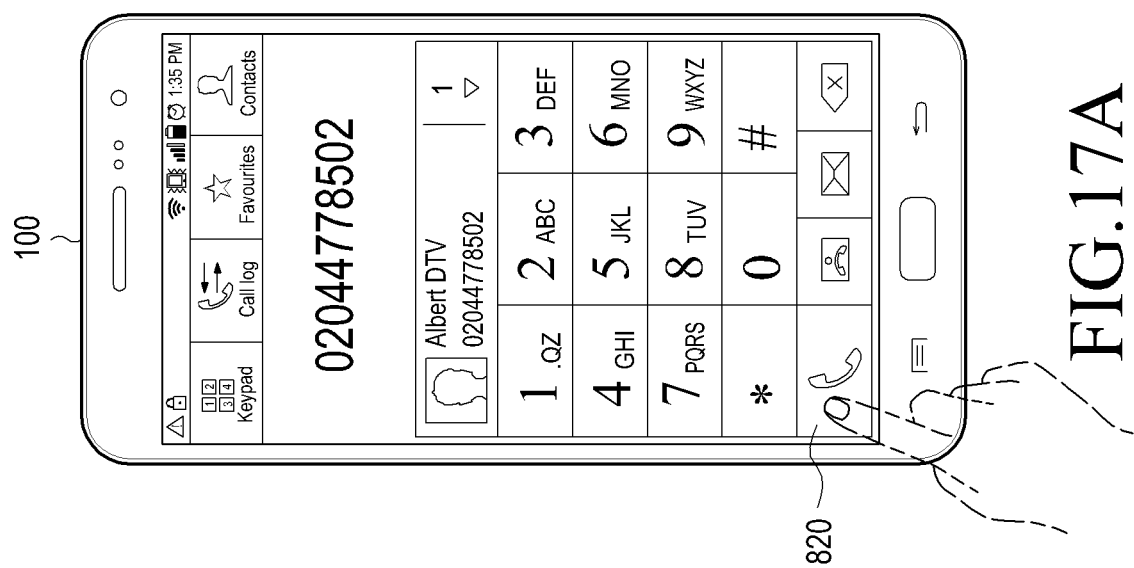

FIGS. 17A and 17B illustrate a case where an electronic device accesses an external device based on access information, according to an exemplary embodiment.

Referring to FIG. 17A, if, for example, the electronic device 100 that has access rights to the external device 200 selects a Call icon 820 after receiving an input phone number 800 which corresponds to the external device (e.g., Albert DTV 810) to control the external device of Albert DTV 810, the electronic device 100 may send an access request to the server (e.g., the server 300). If the electronic device 100 has access rights to the external device of Albert DTV 810, the electronic device 100 may display a screen for controlling the external device of Albert DTV 810 as shown in FIG. 17B. On the displayed screen there may be displayed a service type 862 that includes, for example, TV Monitor 870, Whiteboard 872 and Video Share 874. If the service type TV Monitor 870 is used as described in connection with FIG. 8, an image or video 860 captured by the camera included in the external device 200 (e.g., TV) may be displayed on the display 130 of the electronic device 100.

Figure 18:
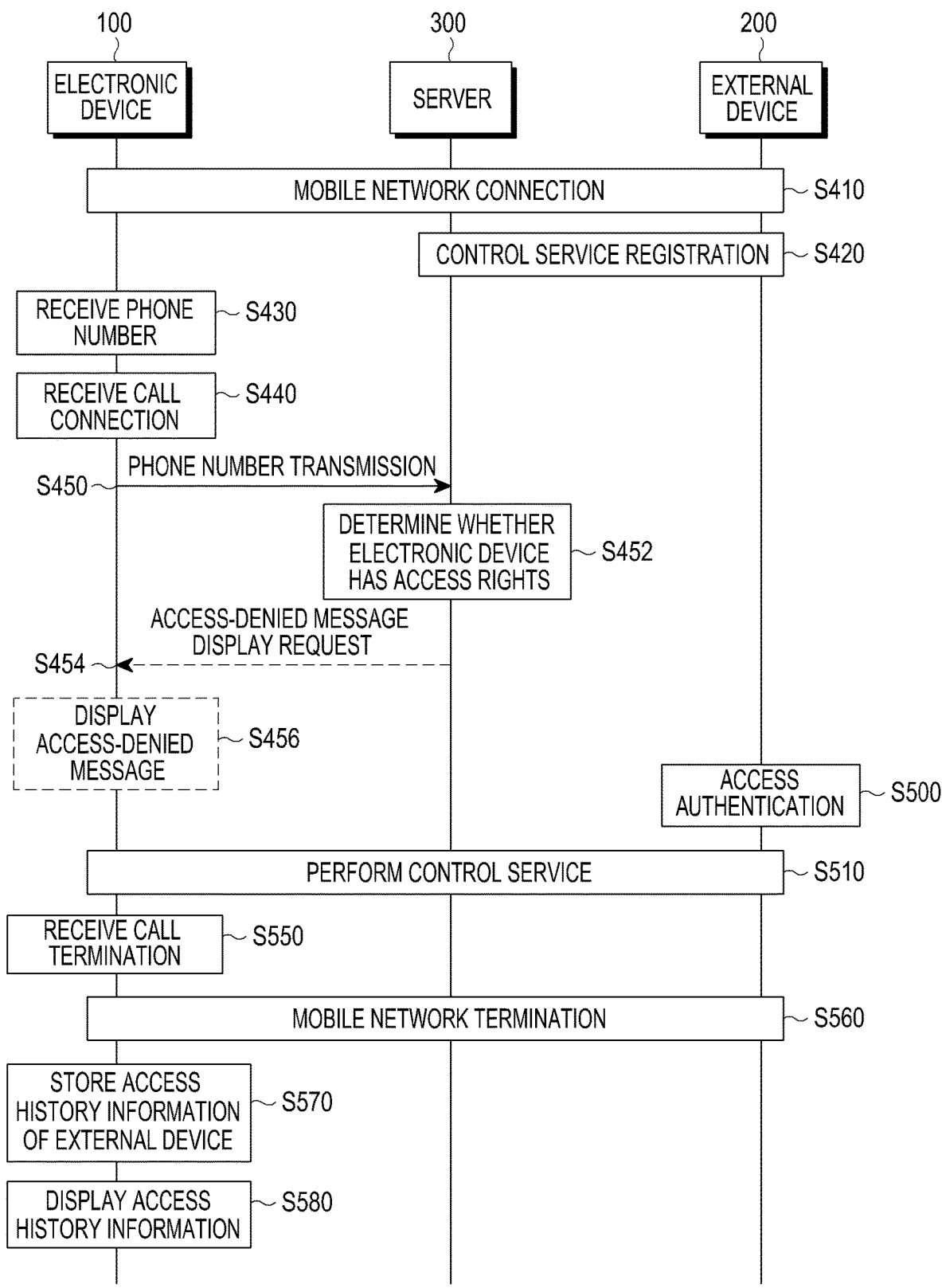
FIG. 18 is a flowchart illustrating a method of controlling an external device, according to another exemplary embodiment.

FIG. 18 is a flowchart illustrating a method of controlling an external device according to another exemplary embodiment.

Referring to FIG. 18, the method of controlling an external device according to another exemplary embodiment may be the same as the method described in connection with FIG. 4 except that operation S452 of determining whether the electronic device 100 has access rights, operation S454 of sending a request to display an access-denied message in response to an access request upon receiving the access request (e.g., operation S450 of sending a phone number to the server 300) from the electronic device that does not have access rights, and operation S456 of displaying the access-denied message upon request of the server 300. If it is determined in operation S452 that the electronic device 100 is an electronic device that has the fair access rights, the control service may be performed among the electronic device 100, the external device 200 and the server 300, in operation S510. In addition, since other operations shown in FIG. 18 are the same as the corresponding operations described in FIG. 4, a detailed description thereof will be omitted.

Figures 19A, 19B, 19C:
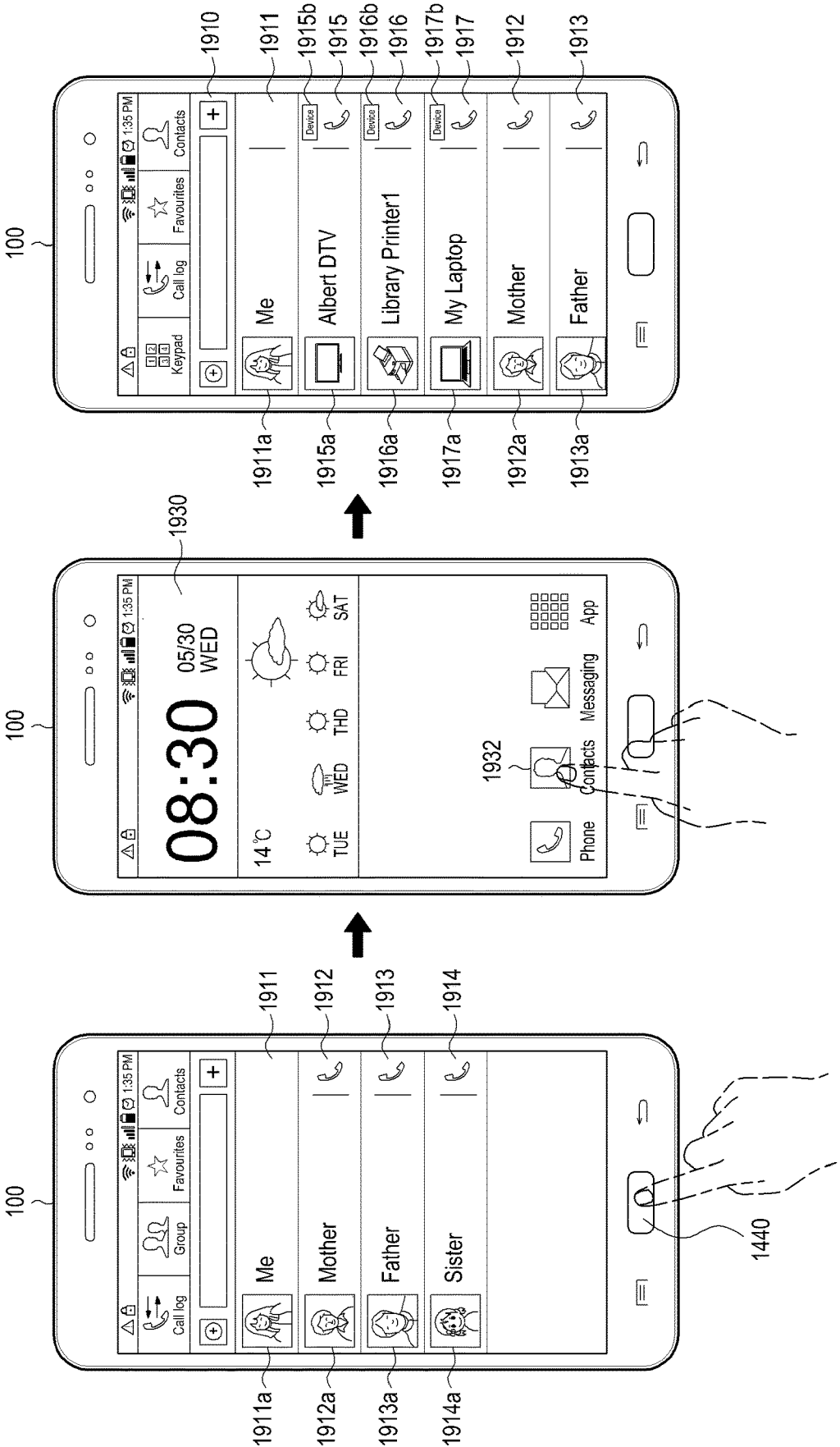
FIGS. 19A, 19B, and 19C illustrate a function or operation of receiving identification information of an external device, which is stored in a server, in response to a synchronization event and displaying the received identification information on an electronic device, according to an exemplary embodiment.

FIGS. 19A to 19C illustrate a function or operation of receiving identification information of an external device, which is stored in a server, in response to a synchronization event and displaying the received identification information on an electronic device, according to an exemplary embodiment.

As shown in FIG. 19A, a phonebook list including phonebook items 1911, 1912, 1913 and 1914 may be displayed in a phonebook application. Images 1911a, 1912a, 1913a and 1914a of the user and/or his acquaintances corresponding to the phonebook items 1911, 1912, 1913 and 1914 may be displayed together in the phonebook list. After exiting the phonebook application, the user may press the Home button 1940 to view a home screen 1930. Accordingly, as shown in FIG. 19B, the home screen 1930 may be displayed on the electronic device 100, and the user may select a phonebook application 1932 to check the phonebook list. If an event to select, for example, the phonebook application 1932 is detected as shown in FIG. 19B, the electronic device 100 may detect the event as a synchronization event. In other words, if the synchronization event (e.g., execution of the phonebook application) is detected to receive (e.g., to synchronize the electronic device with the server in terms of the phonebook data) identification information of various external devices (e.g., the external device 200), which is stored in the server (e.g., the server 300), the electronic device 100 may send a request for identification information of the external device 200 to the server 300. Although "execution of application" has been illustratively mentioned as an example of the synchronization event, this is merely an example. The synchronization event may be include, for example, a case where an application is terminated, a case where a predetermined time has elapsed, a case where a time interval is specified at which the synchronization is periodically performed, and a case where the electronic device is powered on/off.

Referring to FIG. 19C, if the synchronization event occurs and is detected as shown in FIG. 19B, the electronic device 100 may receive identification information of the external device 200 from the server 300, and display items 1915, 1916 and 1917 of the external device 200 capable of performing the control service. In this case, the items for the external device 200 may display together images 1915a, 1916a and 1917a and/or external device indication messages 1915b, 1916b and 1917b corresponding to items 1915, 1916 and 1917, in order to distinguish the user and/or his acquaintances. However, for example, if the exemplary embodiment(s) described in connection with FIG. 19 is applied to the electronic device 100 or a method for controlling the electronic device 100 according to another exemplary embodiment, it may be premised that the electronic device 100 has access rights to the items of the external device 200, which are displayed in the phonebook application.

Figure 20:
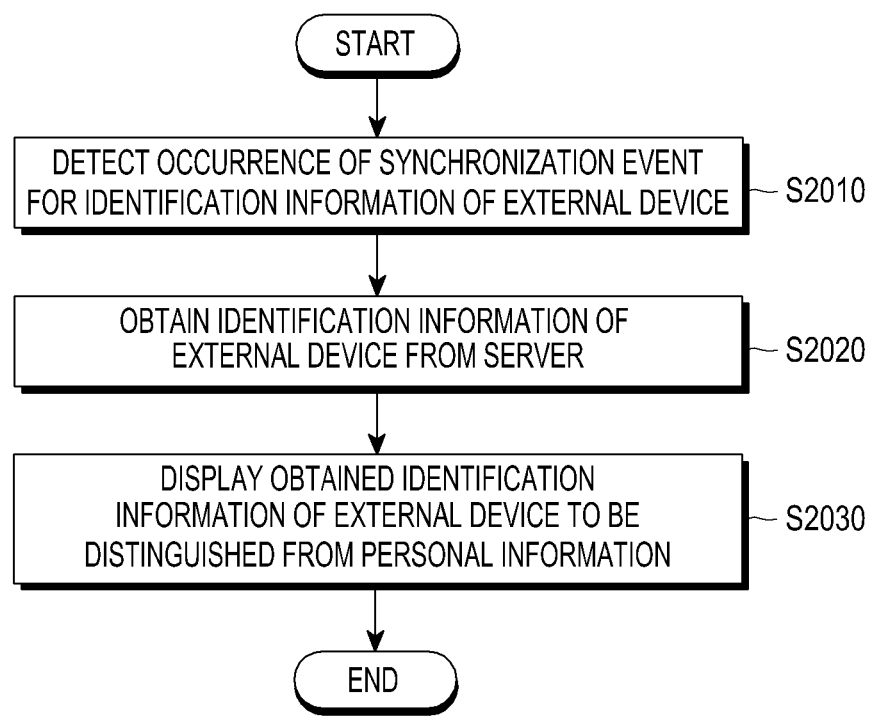
FIG. 20 is a flowchart illustrating a function or operation of receiving information on an external device, which is stored in a server, in response to an occurrence or detection of a synchronization event and displaying the received information on an electronic device, according to an exemplary embodiment.

FIG. 20 is a flowchart illustrating a function or operation of receiving information on an external device, which is stored in a server, in response to an occurrence or detection of a synchronization event and displaying the received information on an electronic device, according to an exemplary embodiment.

Referring to FIG. 20, in operation S2010, an electronic device 100 may detect an occurrence of a synchronization event for identification information of an external device 200. In operation S2020, after detecting the occurrence of the synchronization event, the electronic device 100 may obtain identification information of the external device 200 from a server 300. In operation S2030, the electronic device 100 may display the obtained identification information of the external device 200 to be distinguishable from the information (hereinafter, referred to as "personal information" for convenience of description) about the user of the electronic device 100 and/or his acquaintances. In addition, as for the details, which are not described in connection with FIG. 20, the description of FIGS. 19A, 19B, and 19C may be applied in the same way.

Figure 21:
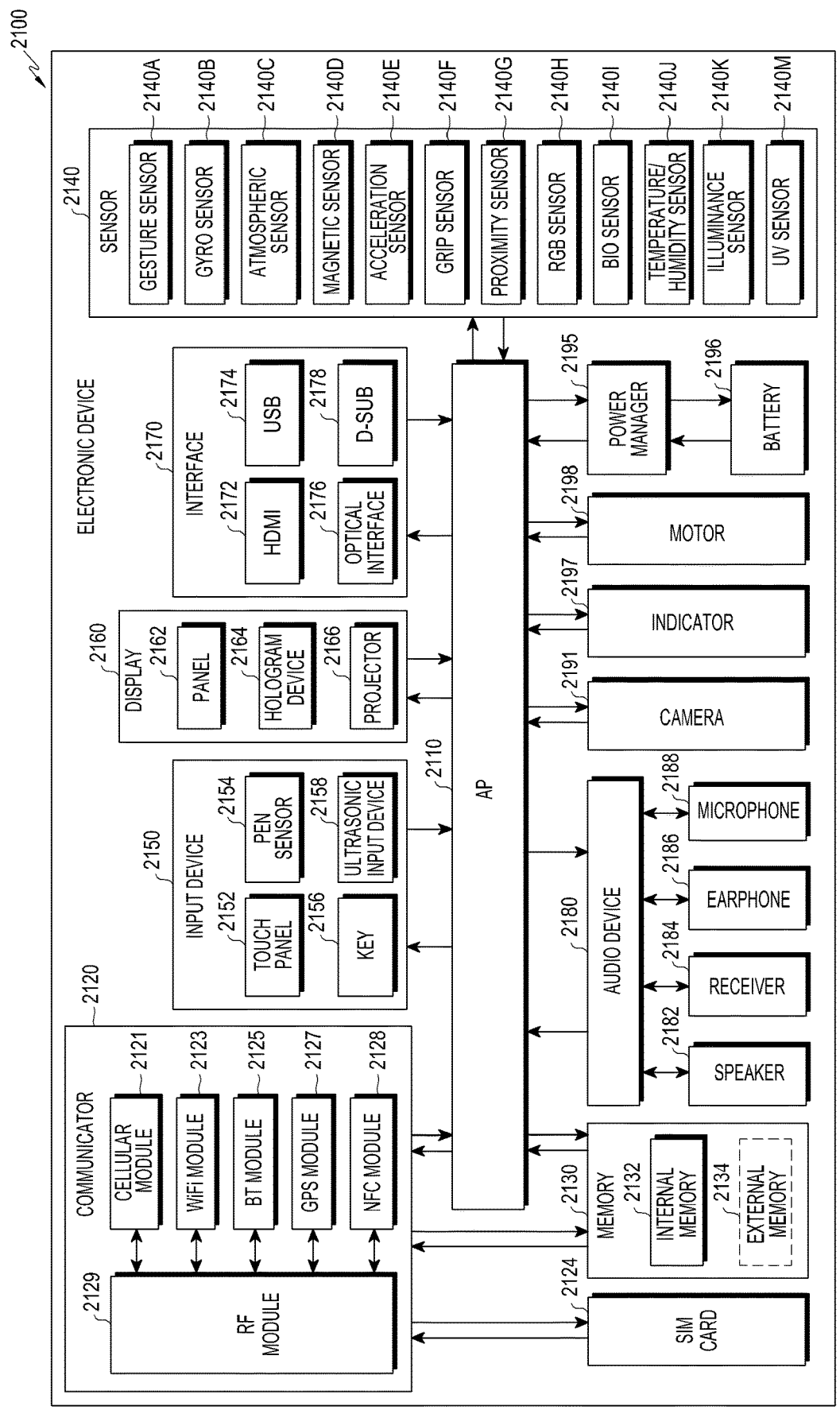
FIG. 21 is a block diagram of an electronic device according to various exemplary embodiments.

FIG. 21 is a block diagram of an electronic device 2100 according to various exemplary embodiments. The electronic device 2100 may configure, for example, the entirety or part of the electronic device 100 shown in FIG. 1. Referring to FIG. 21, the electronic device 2100 may include at least one Application Processor (AP) 2110, a communicator 2120, a Subscriber Identification Module (SIM) card 2124, a memory 2130, a sensor 2140, an input device 2150, a display 2160, an interface 2170, an audio device 2180, a camera 2191, a power manager 2195, a battery 2196, an indicator 2197, and a motor 2198.

The AP 2110 may control a plurality of hardware or software components connected to the AP 2110 by driving the operating system or application program, and may process and compute a variety of data including multimedia data. The AP 2110 may be implemented as, for example, System on Chip (SoC). In an exemplary embodiment, the AP 2110 may further include a Graphic Processing Unit (GPU, not shown).

The communicator 2120 (e.g., the communication interface 120) may perform data transmission/reception in communication between the electronic device 2100 (e.g., the electronic device 100) and other electronic devices (e.g., the external electronic device 200 or the server 300) connected thereto over the network. In an exemplary embodiment, the communicator 2120 may include a cellular module 2121, a WiFi module 2123, a BT module 2125, a GPS module 2127, an NFC module 2128, and a Radio Frequency (RF) module 2129.

The cellular module 2121 may provide a voice call, a video call, text service, an Internet service, or the like over the network (e.g., LTE, LTE-A, CDMA, WCDMA, UMTS, WiBro, GSM, or the like). The cellular module 2121 may perform identification and authentication on the electronic devices in the communication network using, for example, a subscriber identification module (e.g., the SIM card 2124). In an exemplary embodiment, the cellular module 2121 may perform at least some of the functions that the AP 2110 can provide. For example, the cellular module 2121 may perform at least some of the multimedia control functions.

In an exemplary embodiment, the cellular module 2121 may include a Communication Processor (CP). The cellular module 2121 may be implemented as, for example, SoC. Although components such as the cellular module 2121 (e.g., the CP), the memory 2130 or the power manager 2195 are shown as components independent of the AP 2110 in FIG. 21, the AP 2110 may be implemented to include at least some (e.g., the cellular module 2121) of the components according to one exemplary embodiment.

In an exemplary embodiment, the AP 2110 or the cellular module 2121 (e.g., the CP) may load, on a volatile memory, the command or data received from at least one of a non-volatile memory and other components connected thereto, and process the loaded command or data. The AP 2110 or the cellular module 2121 may store in a non-volatile memory the data that is received from or generated by at least one of other components.

Each of the WiFi module 2123, the BT module 2125, the GPS module 2127, or the NFC module 2128 may include, for example, a processor for processing the data that is transmitted and received therethrough. Although the cellular module 2121, the WiFi module 2123, the BT module 2125, the GPS module 2127 and the NFC module 2128 are shown as separate components in FIG. 21, at least some (e.g., two or more components) of the cellular module 2121, the WiFi module 2123, the BT module 2125, the GPS module 2127 and the NFC module 2128 may be incorporated into one Integrated Chip (IC) or IC package according to one exemplary embodiment. For example, at least some (e.g., a CP corresponding to the cellular module 2121 or a WiFi processor corresponding to the WiFi module 2123) of the processors corresponding to the cellular module 2121, the WiFi module 2123, the BT module 2125, the GPS module 2127 and the NFC module 2128 may be implemented as one SoC.

The RF module 2129 may transmit and receive data, for example, RF signals. Although not shown, the RF module 2129 may include, for example, a transceiver, a Power Amp Module (PAM), a frequency filter, a Low Noise Amplifier (LNA), or the like. The RF module 2129 may further include parts (e.g., conductors or conducting wires) for transmitting and receiving electromagnetic waves in the free space in wireless communication. Although the cellular module 2121, the WiFi module 2123, the BT module 2125, the GPS module 2127 and the NFC module 2128 are shown to share one RF module 2129 with each other in FIG. 21, at least one of the cellular module 2121, the WiFi module 2123, the BT module 2125, the GPS module 2127 and the NFC module 2128 may transmit and receive RF signals through a separate RF module according to one exemplary embodiment.

The SIM card 2124 may be a card including a subscriber identification module, and may be inserted into a slot that is formed in a specific position of the electronic device. The SIM card 2124 may include unique identification information (e.g., an Integrated Circuit Card Identifier (ICCID)) or subscriber information (e.g., an International Mobile Subscriber Identity (IMSI)).

The memory 2130 (e.g., the memory 140) may include an internal memory 2132 and an external memory 2134. The internal memory 2132 may include at least one of, for example, a volatile memory (e.g., a Dynamic RAM (DRAM), a Static RAM (SRAM), a Synchronous Dynamic RAM (SDRAM), or the like) and a non-volatile memory (e.g., an One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

In an exemplary embodiment, the internal memory 2132 may be a Solid State Drive (SSD). The external memory 2134 may further include a flash drive (e.g., Compact Flash (CF), Secure Digital (SD), Micro Secure Digital (Micro-SD), Mini Secure Digital (Mini-SD), and extreme Digital (xD), or a memory stick). The external memory 2134 may be functionally connected to the electronic device 2100 through a variety of interfaces. In an exemplary embodiment, the electronic device 2100 may further include a storage device (or storage media) such as a hard drive.

The sensor 2140 may measure a physical quantity or detect an operating state of the electronic device 2100, and convert the measured or detected information into an electrical signal. The sensor 2140 may include at least one of, for example, a gesture sensor 2140A, a gyro sensor 2140B, a pressure sensor 2140C, a magnetic sensor 2140D, an acceleration sensor 2140E, a grip sensor 2140F, a proximity sensor 2140G, a color sensor 2140H (e.g., a Red/Green/Blue (RGB) sensor), a bio sensor 2140I, a temperature/humidity sensor 2140J, an illuminance sensor 2140K, and a Ultra Violet (UV) sensor 2140M. Additionally or alternatively, the sensor 2140 may include, for example, an electronic nose (E-nose) sensor (not shown), an electromyography (EMG) sensor (not shown), an electroencephalogram (EEG) sensor (not shown), an electrocardiogram (ECG) sensor (not shown), an Infra Red (IR) sensor (not shown), iris sensor (not shown), a fingerprint sensor (not shown), or the like. The sensor 2140 may further include a control circuit for controlling at least one of the sensors belonging thereto.

The input device 2150 may include a touch panel 2152, a (digital) pen sensor 2154, a key 2156, or an ultrasonic input device 2158. The touch panel 2152 may recognize a touch input in at least one of, for example, capacitive, resistive, infrared and ultrasonic ways. The touch panel 2152 may further include a control circuit. In the case of the capacitive way, the touch panel 2152 may recognize the physical contact or proximity. The touch panel 2152 may further include a tactile layer. In this case, the touch panel 2152 may provide tactile feedback to the user.

The (digital) pen sensor 2154 may be implemented by using, for example, a method the same as or similar to receiving a user's touch input, or a separate recognition sheet. The key 2156 may include, for example, a physical button, an optical key, or a keypad. The ultrasonic input device 2158 is a device that can determine data by detecting the sound waves with a microphone (e.g., a microphone 2188) in the electronic device 2100, through an input tool that generates an ultrasonic signal, and this device enables wireless recognition. In an exemplary embodiment, the electronic device 2100 may receive a user input from an external device (e.g., a computer or a server) connected thereto using the communicator 2120.

The display 2160 (e.g., the display 130) may include a panel 2162, a hologram device 2164, or a projector 2166. The panel 2162 may be, for example, a Liquid Crystal Display (LCD) panel, an Active-Matrix Organic Light-Emitting Diode (AM-OLED) panel or the like. The panel 2162 may be implemented, for example, in a flexible, transparent or wearable manner. The panel 2162 may be configured in one module together with the touch panel 2152. The hologram device 2164 may show a stereoscopic image in the air using the interference of light. The projector 2166 may display an image by projecting the light onto the screen. The screen may be located, for example, inside or outside the electronic device 2100. In an exemplary embodiment, the display 2160 may further include a control circuit for controlling the panel 2162, the hologram device 2164 or the projector 2166.

The interface 2170 may include, for example, an HDMI 2172, a USB 2174, an optical interface 2176, or a D-sub-miniature (D-sub) 2178. The interface 2170 may be incorporated, for example, into the communication interface 120 shown in FIG. 1. Additionally or alternatively, the interface 2170 may include, for example, a Mobile High-Definition Link (MHL) interface, a Secure Digital (SD) card/Multi-Media Card (MMC) interface, or Infrared Data Association (IrDA) interface.

The audio device 2180 may convert sounds and electronic signals in a two-way manner. At least some of the components of the audio device 2180 may be incorporated, for example, into the I/O interface 150 shown in FIG. 1. The audio device 2180 may process sound information that is input or output through, for example, a speaker 2182, a receiver 2184, an earphone 2186, a microphone 2188, or the like.

The camera 2191 is a device that can capture still images and videos. In an exemplary embodiment, the camera 2191 may include one or more image sensors (e.g., a front sensor or a rear sensor), a lens (not shown), an Image Signal Processor (ISP, not shown), or a flash (e.g., an LED or xenon lamp, not shown).

The power manager 2195 may manage the power of the electronic device 2100. Although not shown, the power manager 2195 may include, for example, a Power Management Integrated Circuit (PMIC), a charger Integrated Circuit (IC), or a battery or fuel gauge.

The PMIC may be mounted, for example, in an IC or SoC semiconductor. The charging scheme can be classified into a wired charging scheme and a wireless charging scheme. The charger IC may charge a battery, and may prevent inflow of the over-voltage or over-current from the charger. In an exemplary embodiment, the charger IC may include a charger IC for at least one of the wired charging scheme and the wireless charging scheme. The wireless charging scheme may include, for example, a magnetic resonance scheme, a magnetic induction scheme, an electromagnetic scheme or the like, and may further include additional circuits (e.g., a coil loop, a resonant circuit, a rectifier or the like) for wireless charging.

The battery gauge may measure, for example, the level, charging voltage, charging current or temperature of the battery 2196. The battery 2196 may store or generate electricity, and may supply power to the electronic device 2100 using the stored or generated electricity. The battery 2196 may include, for example, a rechargeable battery or a solar battery.

The indicator 2197 may indicate a specific state (e.g., a boot state, a message state, charging state or the like) of the electronic device 2100 or a part thereof (e.g., the AP 2110). The motor 2198 may convert an electrical signal into mechanical vibrations. Although not shown, the electronic device 2100 may include a processing unit (e.g., a GPU) for mobile TV support. The processing unit for mobile TV support may process media data based on the standards such as, for example, Digital Multimedia Broadcasting (DMB), Digital Video Broadcasting (DVB), or Media Flow.

Each of the above-described components of the electronic device according to various exemplary embodiments may be configured with one or more components or elements, and names of the components may vary depending on the type of the electronic device. The electronic device according to various exemplary embodiments may be configured to include at least one of the above-described components, and some of the components may be omitted, or the electronic device may include other additional components. Some of the components of the electronic device according to various exemplary embodiments may be configured as one entity by being combined, so the entity may perform the same functions of the components as those given before the combination.

Figure 22:
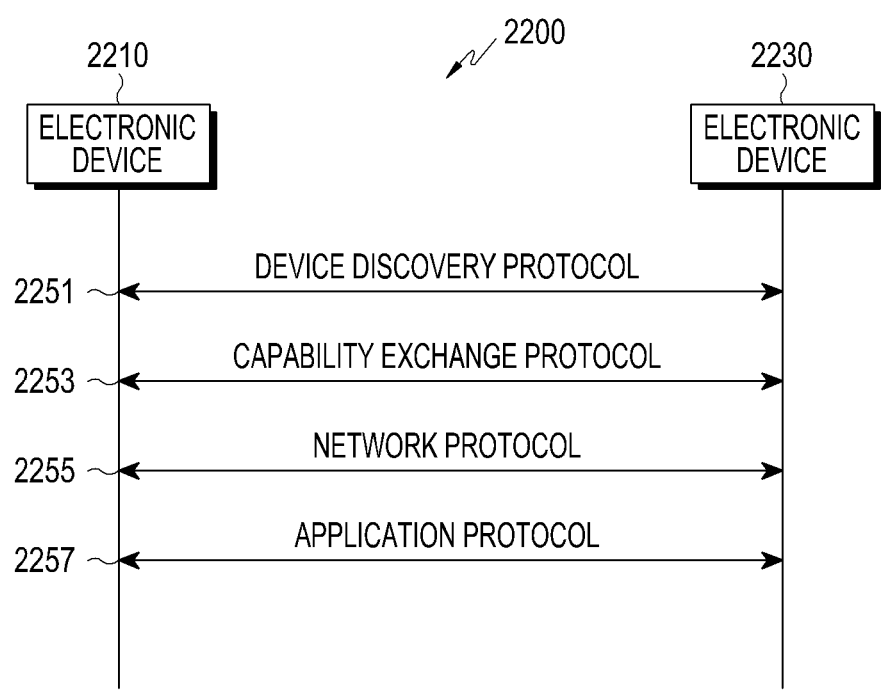
FIG. 22 illustrates a communication protocol between a plurality of electronic devices according to various exemplary embodiments.

FIG. 22 illustrates a communication protocol 2200 between a plurality of electronic devices (e.g., an electronic device 2210 and an electronic device 2230) according to various exemplary embodiments. Referring to FIG. 22, the communication protocol 2200 may include, for example, a device discovery protocol 2251, a capability exchange protocol 2253, a network protocol 2255, and an application protocol 2257.

In an exemplary embodiment, the device discovery protocol 2251 may be a protocol by which electronic devices (e.g., the electronic device 2210 or the electronic device 2230) can detect an external device that can communicate with the electronic devices, or connect with the detected external device. For example, the electronic device 2210 (e.g., the electronic device 100) may detect the electronic device 2230 (e.g., the external electronic device 200) as a device that can communicate with the electronic device 2210, through a communication method (e.g., WiFi, BT, USB or the like) available in the electronic device 2210, using the device discovery protocol 2251. The electronic device 2210 may obtain and store identification information about the detected electronic device 2230 using the device discovery protocol 2251, for the communication connection with the electronic device 2230. The electronic device 2210 may establish a communication connection with the electronic device 2230 based on, for example, at least the identification information.

In certain exemplary embodiments, the device discovery protocol 2251 may be a protocol for mutual authentication between a plurality of electronic devices. For example, the electronic device 2210 may perform authentication between the electronic device 2210 and the electronic device 2230 based on communication information (e.g., a MAC address, a Universally Unique Identifier (UUID), a Subsystem Identification (SSID), and Information Provider (IP) address) for a connection with at least the electronic device 2230.

In an exemplary embodiment, the capability exchange protocol 2253 may be a protocol for exchanging information related to the function of the service supportable in at least one of the electronic device 2210 and the electronic device 2230. For example, the electronic device 2210 and the electronic device 2230 may exchange with each other the information related to the function of the service that is currently provided by each of them, using the capability exchange protocol 2253. The exchangeable information may include identification information indicating a specific service among a plurality of services supportable in the electronic device 2210 and the electronic device 2220. For example, the electronic device 2210 may receive identification information for a specific service provided by the electronic device 2230, from the electronic device 2230 using the capability exchange protocol 2253. In this case, based on the received identification information, the electronic device 2210 may determine whether the electronic device 2210 can support the specific service.

In an exemplary embodiment, the network protocol 2255 may be a protocol for controlling a flow of the data that is, for example, transmitted and received to provide linked services, between the electronic devices (e.g., the electronic device 2210 and the electronic device 2230) that are connected to enable communication. For example, at least one of the electronic device 2210 and the electronic device 2230 may perform error control or data quality control using the network protocol 2255. Additionally or alternatively, the network protocol 2255 may determine a transport format of the data that is transmitted and received between the electronic device 2210 and the electronic device 2230. At least one of the electronic device 2210 and the electronic device 2230 may manage (e.g., connect or terminate) at least one session for mutual data exchange using the network protocol 2255.

In an exemplary embodiment, the application protocol 2257 may be a protocol for providing a procedure or information for exchanging data related to the service provided to the external device. For example, the electronic device 2210 (e.g., the electronic device 100) may provide a service to the electronic device 2230 (e.g., the external electronic device 200 or the server 300) using the application protocol 2257.

In an exemplary embodiment, the communication protocol 2200 may include a standard communication protocol, a communication protocol (e.g., a communication protocol specified by a communication device manufacturer or a network provider itself) specified by an individual or an organization, or a combination thereof.

The term 'module' as used herein may refer to a unit that includes any one or a combination of, for example, hardware, software and firmware. The 'module' may be interchangeably used with a term such as, for example, unit, logic, logical block, component, or circuit. The 'module' may be the minimum unit of an integrally configured part, or a part thereof. The 'module' may be the minimum unit for performing one or more functions, or a part thereof. The 'module' may be implemented mechanically or electronically. For example, the 'module' according to various exemplary embodiments may include at least one of an Application-Specific Integrated Circuit (ASIC) chip, Field-Programmable Gate Arrays (FPGAs), or a programmable-logic device, which are known or will be developed in the future, and which perform certain operations.

In various exemplary embodiments, at least a part of the apparatus (e.g., modules or functions thereof) or method (e.g., operations) according to various exemplary embodiments may be implemented, for example, by an instruction(s) that is stored in computer-readable storage media in the form of a programming module. If the instruction is executed by one or more processors (e.g., the processor 110), the one or more processors may perform the function corresponding to the instruction. The computer-readable storage media may be, for example, the memory 140. At least a part of the programming module may be implemented (e.g., executed) by, for example, the processor 110. At least a part of the programming module may include, for example, a module, a program, a routine, a set of instructions, or a process, for performing one or more functions.

A computer-readable recording medium may include magnetic media (e.g., hard disks, floppy disks, and magnetic tape), optical media (e.g., Compact Disc Read Only Memory (CD-ROM), Digital Versatile Disc (DVD)), magneto-optical media (e.g., optical disk), and hardware devices (e.g., Read Only Memory (ROM), Random Access Memory (RAM) and flash memory) specially configured to store and perform program instructions (e.g., programming modules). The program instructions may include not only the machine code produced by a compiler, but also the high-level language code that can be executed by a computer using an interpreter or the like. The above hardware device may be configured to operate as one or more software modules to perform operations according to various exemplary embodiments, and vice versa.

The module or programming module according to various exemplary embodiments may include at least one of the above-described components, or some of them may be omitted. Alternatively, the module or programming module may further include other additional components. Operations performed by the module, programming module or other components according to various exemplary embodiments may be executed in a sequential, parallel, iterative, or heuristic manner. Some operations may be executed in a different order, or may be omitted. Alternatively, other operations may be added.

In various exemplary embodiments, in a storage medium storing instructions, the instructions are set to allow at least one processor to perform at least one operation when the instructions are executed by the at least one processor. The at least one operation may include an operation of transmitting an input phone number to a server over a mobile network, if a call connection is input; an operation of receiving an identifier of an external device, which is issued in the server, from the server, if service authentication is performed as the input phone number is the same as a phone number of the external device registered in the server; an operation of sending a connection request to the external device over the mobile network using the received identifier of the external device; and an operation of controlling the external device by sending a control command to the external device, upon receiving a completion of access authentication from the external device.

As is apparent from the foregoing description, according to an exemplary embodiment, the electronic device may send a connection request to an external device, using a phone number of the registered external device, which is issued in a server.

According to an exemplary embodiment, the electronic device may request control of the external device by performing access authentication to the external device.

According to an exemplary embodiment, the electronic device may receive an identifier of an external device based on a phone number of the external device, and control the external device using the identifier of the external device.

According to an exemplary embodiment, since the electronic device can easily start control of the external device using the phone number of the external device, a separate gateway device is not necessary and there is no need to install a separate application.

According to an exemplary embodiment, the user of the electronic device may check the access history information of the external device that the user has accessed.

While the disclosure has been shown and described with reference to certain exemplary embodiments thereof, it will be understood by those skilled in the art that various changes in form and details may be made therein without departing from the spirit and scope of the inventive concept as defined by the appended claims and their equivalents.

What is claimed is:

1. An electronic device for controlling an external device using a number, the electronic device comprising:
 a display;
 a communication interface; and
 a processor configured to:
  control the display to display a call application,
  in response to receiving a command for making a phone call to a number representing the external device, via the call application, transmit, through the communication interface, the number to a server over a mobile network,
  receive, through the communication interface, a network address of the external device, which is mapped onto the number in the server, from the server in response to a transmission of the number to the server,
  send, through the communication interface, to the external device a connection request for establishing a connection between the electronic device and the external device using the network address of the external device,
  in response to the connection request being granted, control the display to display a control menu for selecting one of different types of services which are provided by the external device to allow the electronic device to control the external device, and
  send, through the communication interface, a control command for controlling the external device using a service selected from the different types of services, through the connection that is established by the call application according to the command for making the phone call to the number, wherein a name of the external device is displayed on a contact list along with names of people stored as contacts.

2. The electronic device of claim 1, wherein the network address of the external device is generated by the server.

3. The electronic device of claim 1, wherein the processor is further configured to:
 receive, through the communication interface, a request for an authentication code from the external device, and
 if the authentication code is inputted to the electronic device, transmit, through the communication interface, the authentication code to the external device.

4. The electronic device of claim 1, wherein the processor is further configured to receive the control command through the control menu.

5. The electronic device of claim 1, wherein the processor is further configured to control the communication interface to transmit an access request including identification information of the electronic device to the server, in order to be granted access rights to the external device.

6. The electronic device of claim 5, wherein the access rights to the external device are determined based on the identification information of the electronic device.

7. The electronic device of claim 1, wherein the processor is further configured to:
 when a synchronization event occurs, receive another number representing another external device, which is newly registered in the server, from the server through the communication interface.

8. The electronic device of claim 1, wherein the processor is further configured to control the display to display the number representing the external device together with other phone numbers in the contact list of the electronic device.

9. A method for controlling an external device by an electronic device, the method comprising:
 displaying a call application;
 in response to receiving a command for making a phone call to a number representing the external device, via the call application, transmitting the number to a server over a mobile network;
 receiving a network address of the external device, which is mapped onto the number in the server, from the server in response to a transmission of the number to the server;
 sending, to the external device, a connection request for establishing a connection between the electronic device and the external device using the network address of the external device;
 in response to the connection request being granted, displaying a control menu for selecting one of different types of services which are provided by the external device to allow the electronic device to control the external device; and
 sending a control command for controlling the external device using a service selected from the different types of services, through the connection that is established by the call application according to the command for making the phone call to the number, wherein a name of the external device is displayed on a contact list along with names of people stored as contacts.

10. The method of claim 9, wherein the number representing the external device is generated by the server.

11. The method of claim 9, wherein the network address of the external device is generated by the server.

12. The method of claim 9, wherein the control command is inputted through the control menu.

13. The method of claim 9, further comprising:
transmitting an access request including identification information of the electronic device to the server, in order to be granted access rights to the external device.

14. The method of claim 13, wherein the access rights to the external device are determined based on the identification information of the electronic device.

15. The method of claim 9, further comprising:
if a synchronization event occurs, receiving a new number representing another external device, which is registered in the server, from the server.

16. The method of claim 9, further comprising:
displaying the number representing the external device together with other phone numbers in the contact list of the electronic device.

17. The electronic device of claim 1, wherein the control command is sent to the external device after a message indicating that the electronic device is successfully authenticated by the external device is received from the external device.

18. The method of claim 9, wherein the control command is sent to the external device after a message indicating that the electronic device is successfully authenticated by the external device is received from the external device.

* * * * *